United States Patent
Ghosh et al.

(10) Patent No.: US 11,530,986 B2
(45) Date of Patent: Dec. 20, 2022

(54) IMAGE CAPTURE AND PROCESSING

(71) Applicant: Imperial College Innovations Limited, London (GB)

(72) Inventors: Abhijeet Ghosh, London (GB); Yuliya Gitlina, London (GB); Giuseppe Claudio Guarnera, London (GB); Daljit Singh Dhillon, London (GB)

(73) Assignee: Imperial College Innovations Limited, London (GB)

( * ) Notice: Subject to any disclaimer, the term of this patent is extended or adjusted under 35 U.S.C. 154(b) by 107 days.

(21) Appl. No.: 16/940,107

(22) Filed: Jul. 27, 2020

(65) Prior Publication Data
US 2022/0003671 A1 Jan. 6, 2022

(30) Foreign Application Priority Data

Jul. 2, 2020 (GB) .................................. 2010191

(51) Int. Cl.
*G01N 21/55* (2014.01)
*G06V 40/16* (2022.01)
(Continued)

(52) U.S. Cl.
CPC ........... *G01N 21/55* (2013.01); *G06T 7/0014* (2013.01); *G06T 17/00* (2013.01); *G06V 40/16* (2022.01)

(58) Field of Classification Search
CPC ....... G06T 17/00; G06T 7/0014; G06V 40/16; G01N 21/55
(Continued)

(56) References Cited

U.S. PATENT DOCUMENTS

| 6,081,612 A | 6/2000 | Gutkowicz-Krustin et al. |
| 2009/0137908 A1* | 5/2009 | Patwardhan ........... A61B 5/444 600/476 |

(Continued)

FOREIGN PATENT DOCUMENTS

| CN | 109325938 A | 2/2019 |
| EP | 2042095 A1 | 1/2009 |

(Continued)

OTHER PUBLICATIONS

International Search report and Written Opinion for PCT/GB2020/052721 dated Apr. 29, 2021, 20 pages.
(Continued)

*Primary Examiner* — Wednel Cadeau
(74) *Attorney, Agent, or Firm* — Linda B. Huber; Nixon Peabody LLP

(57) ABSTRACT

A method of image processing includes receiving a first image of human skin. The first image corresponds to a first, uniform broadband illumination condition. The method also includes receiving a second image which has the same field of view and contents as the first image. The second image corresponds to a second illumination condition which comprises a uniform narrowband illumination condition. The method also includes processing the first and second images to fit parameter maps for a spectral bidirectional scattering surface reflectance distribution function skin model. The parameter maps include a modelled melanin concentration, a modelled haemoglobin concentration, a modelled melanin blend-type fraction and a modelled epidermal haemoglobin fraction. At least three of the parameter maps are independent.

16 Claims, 20 Drawing Sheets
(20 of 20 Drawing Sheet(s) Filed in Color)

Antera albedo

Antera adapted

(51) Int. Cl.
G06T 7/00 (2017.01)
G06T 17/00 (2006.01)
(58) Field of Classification Search
USPC .......................................................... 382/191
See application file for complete search history.

(56) References Cited

U.S. PATENT DOCUMENTS

| | | | |
|---|---|---|---|
| 2011/0206254 A1* | 8/2011 | Patwardhan | A61B 5/441 |
| | | | 382/128 |
| 2014/0257113 A1 | 9/2014 | Panasyuk et al. | |
| 2017/0224270 A1* | 8/2017 | Stamnes | G06V 20/10 |
| 2020/0082572 A1 | 3/2020 | Beeler et al. | |

FOREIGN PATENT DOCUMENTS

| | | |
|---|---|---|
| GB | 2429523 A | 2/2007 |
| WO | 2016183676 A1 | 11/2016 |

OTHER PUBLICATIONS

Alotaibi et al., A Biophysical 3D Morphable Model of Face Appearance, IEEE International Conference on Computer Vision Workshops, ICCV Workshops, 2017, pp. 824-832.
Barnard et al., Sensor sharpening for computational color constancy, Journal of the Optical Society of America. A, Optics, image science, and vision, 2001, vol. 18(11), pp. 2728-2743.
Bianco et al., Two New von Kries Based Chromatic Adaption Transforms Found by Numerical Optimization, Color Research and Application, 2010, vol. 35(3), pp. 184-192.
Brainard et al., Colorimetry, 2010.
Chauhan et al., Chromatic luminance sensitivity for skin and skinlike textures, Journal of Vision, 2019, vol. 19(1), pp. 1-18.
Chen et al., Hyperspectral Modeling of Skin Appearance, ACM Transaction on Graphics, 2015, vol. 34(3), pp. 31-31:14.
Cotton et al., A skin imaging method based on a colour formation model and its application to the diagnosis of pigmented skin lesions, Proceedings of Medical Image Understanding and Analysis 99, 1999, pp. 49-52.
Donner et al., Light Diffusion in Multi-Layered Translucent Materials, The Association for Computing Machinery, Inc., 2005, pp. 1032-1039.
Donner et al., A Spectral BSSRDF for Shading Human Skin, Eurographics Symposium on Rendering, Eurographics Association, 2006, pp. 409-417.
Donner et al, A Layered, Heterogenous Reflectance Model for Acquiring and Rendering Human Skin, ACM Transactions on Graphics, 2008, vol. 27(5), pp. 140-140:12.
Ghosh et al., Practical Modeling and Acquisition of Layered Facial Reflectance, ACM Transactions on Graphics, 2008, vol. 27(5), pp. 139-139:10.
Ghosh et al., Multiview Face Capture using Polarized Spherical Gradient Illumination, ACM Transactions on Graphics, 2011, vol. 30(6), pp. 129-129:10.
Gillies et al., Fluorescence Excitation Spectroscopy Provides Information About Human Skin In Vivo, Journal of Investigative Dermatology, 2000, vol. 115(4), pp. 704-707.
Guang-Bin Huang, Learning Capability and Storage Capacity of Two-Hidden-Layer Feedforward Networks, IEE Transaction on Neural Networks, 2003, vol. 14(2), pp. 274-281.
Igarashi et al., The Appearance of Human Skin: A Survey, Foundations and Trends in Computer Graphics and Vision, 2007, vol. 3(1), pp. 1-95.
Iglesias-Guitian et al., A Biophysically-Based Model of the Optical Properties of Skin Aging, Comput. Graph. Forum, 2015, vol. 34(2), pp. 45-55.
Jensen et al., A Practical Model for Subsurface Light Transport, ACM SIGGRAPH, 2001, pp. 511-518.
Jimenez et al., Screen-Space Perceptual Rendering of Human Skin, ACM Transaction on Applied Perception, 2009, vol. 6(4), pp. 23-23:15.
Jimenez et al., A Practical Appearance Model for Dynamic Facial Color, ACM Transactions on Graphics, 2010, vol. 29(6), pp. 141-141:9.
Klehm et al., Recent Advances in Facial Appearance Capture, Computer Graphics Forum (CGF), 2015, vol. 34(2), pp. 709-733.
Krishnaswamy et al., A Biophysically-Based Spectral Model of Light Interaction with Human Skin, Comput. Graph. Forum, 2004, vol. 23(3), pp. 331-340.
Schonberger et al., Pixelwise View Selection for Unstructured Multi-View Stereo, European Conference on Computer Vision, 2016.
Schonberger et al., Structure-from-Motion Revisited, IEEE Computer Society, 2016, pp. 4104-4113.
Tsumura et al., Image-based skin color and texture analysis/synthesis by extracting hemoglobin and melanin information in the skin, ACM Trans. Graph, 2003, pp. 770-780.
Wenger et al., Optimizing Color Matching in a Lighting Reproduction System for Complex Subject and Illuminant Spectra, Eurographics Symposium on Rendering, 2003, pp. 249-259.
Weyrich et al., Analysis of Human Faces using a Measurement-Based Skin Reflectance Model, ACM Transactions on Graphics, 2006, pp. 1013-1024.
Weyrich et al., Principles of Appearance Acquisition and Representation, Foundations and Trends in Computer Graphics and Vision, 2008, vol. 4(2), pp. 1-121.
Gitlina et al., Practical Measurement and Modeling of Spectral Sking Relfectance, SIGGRAPH '19 Posters, Jul. 28-Aug. 1, 2019.
Yan et al., A BSSRDF Model for Efficient Rendering of Fur with Global Illumination, ACM Transcations on Graphics, 2017, vol. 36(6), pp. 208-208:13.
Preece et al., Spectral Filter Optiminzation for the Recovery of Parameters which Describe Human Skin, IEEE Transaction on Pattern Analysis and Machine Intelligence, 2004, vol. 26(7), pp. 913-922.
Park et al., Multispectral Imaging Using Multiplexed Illumination, In Proceedings of IEEE International Conference on Computer Vision, 2007.
Matias et al., Skin colour, skin redness and melanin biometric measurements: comparison study between Antera 3D Mexameter and Colorimeter, Skin Research and Technology, 2015, pp. 346-362.
David J.C. MacKay, Bayesian Interpolation, Neural Computation, 1991, pp. 1-14.
Linming et al., Comparison of two skin imaging analysis instruments: The VISIA from Canfield vs the ANTERA 3D CS from Miravex, Skin Res Technol., 2018, vol. 24(3-8), pp. 3-8.
LeGendre et al., Practical Multispectral Lighting Reproduction, ACM Trans. Graph, 2016, vol. 35(4), pp. 32-32:11.
UK Combined Search and Examination Report for GB 2010191.1, dated Dec. 18, 2020, 5 pages.

* cited by examiner

FIG.1A  FIG.1B  FIG.1C $\beta_m = 0.0$     $\beta_m = 1.0$     $C_{bg} = 0.1$     $C_{bg} = 0.6$ 2D model     Photograph     4D model

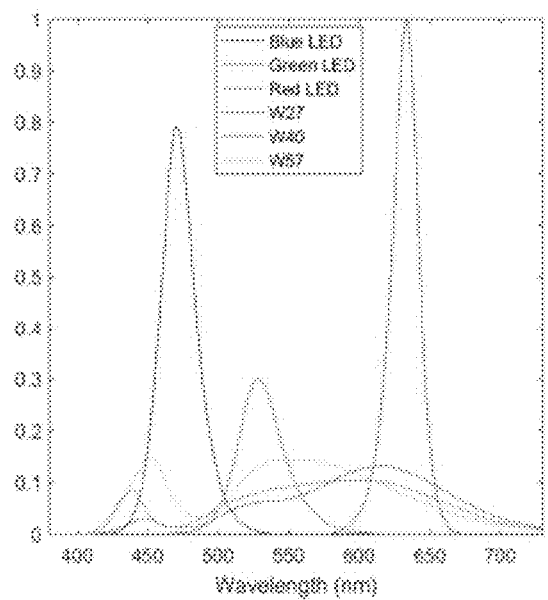
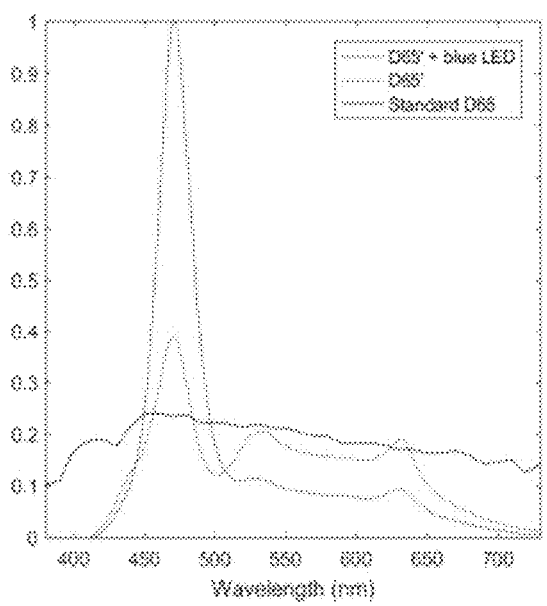
FIG.4A              FIG.4B
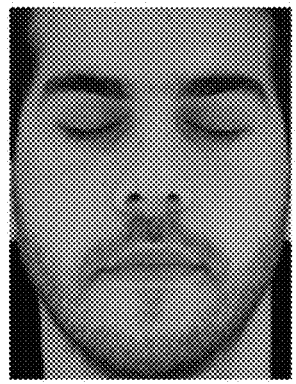
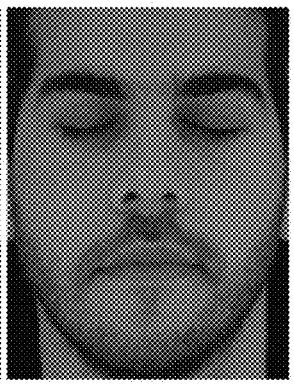
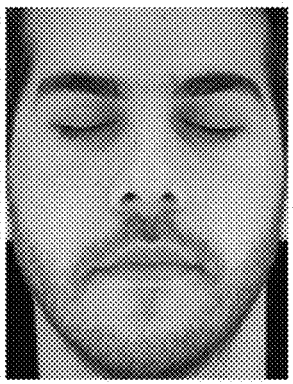
*D65'*                *D65' + blue*            synth. image
Fig.5A               Fig.5B                   Fig.5C
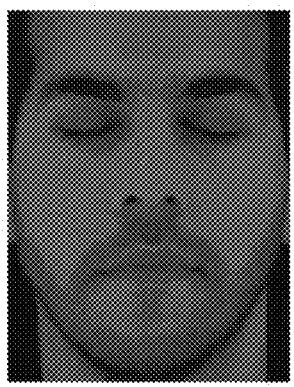
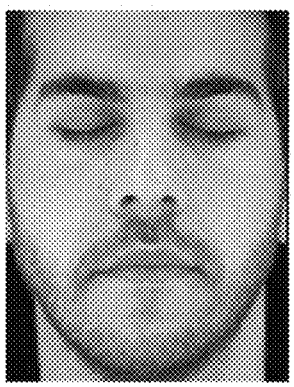
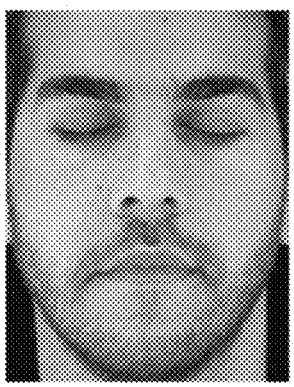
direct blue illum.    direct blue isol.        synth. blue isol.
Fig.5D               Fig.5E                   Fig.5F

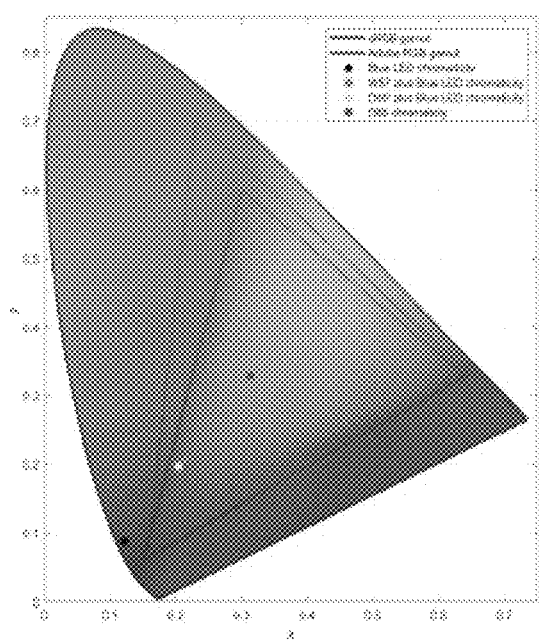
FIG.6A
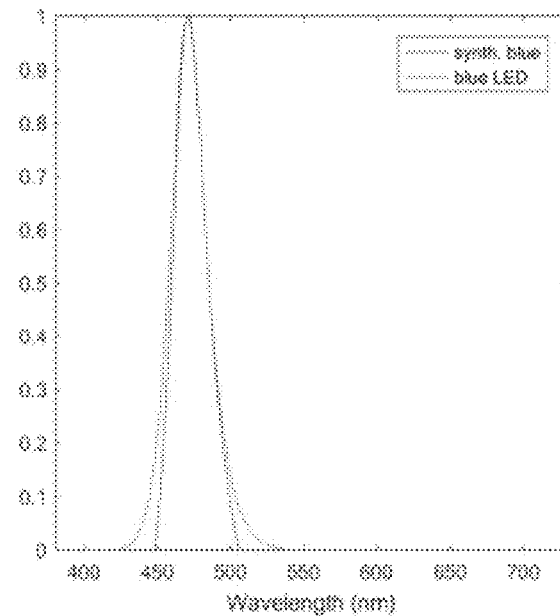
FIG.6B
$C_m$ FIG.7A  $\beta_m$ FIG.7B  $C_h$ FIG.7C  $C_{he}$ FIG.7D
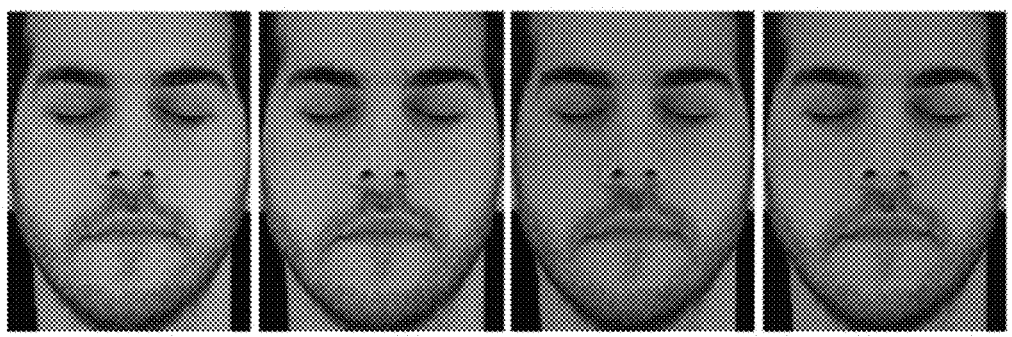
$D65'$ photo FIG.7E  $D65'$ recon. FIG.7F  $W27$ photo FIG.7G  $W27$ recon. FIG.7H

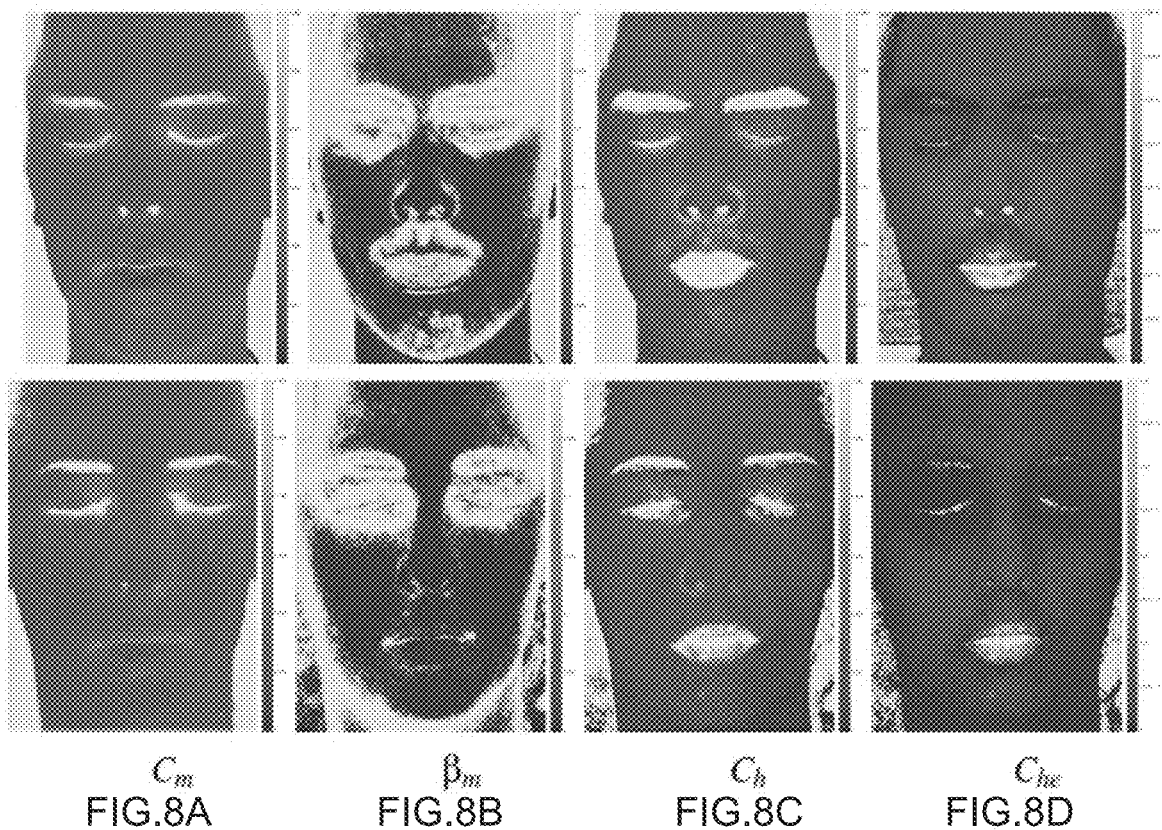
| $C_m$ | $\beta_m$ | $C_b$ | $C_{bc}$ |
|---|---|---|---|
| FIG.8A | FIG.8B | FIG.8C | FIG.8D |
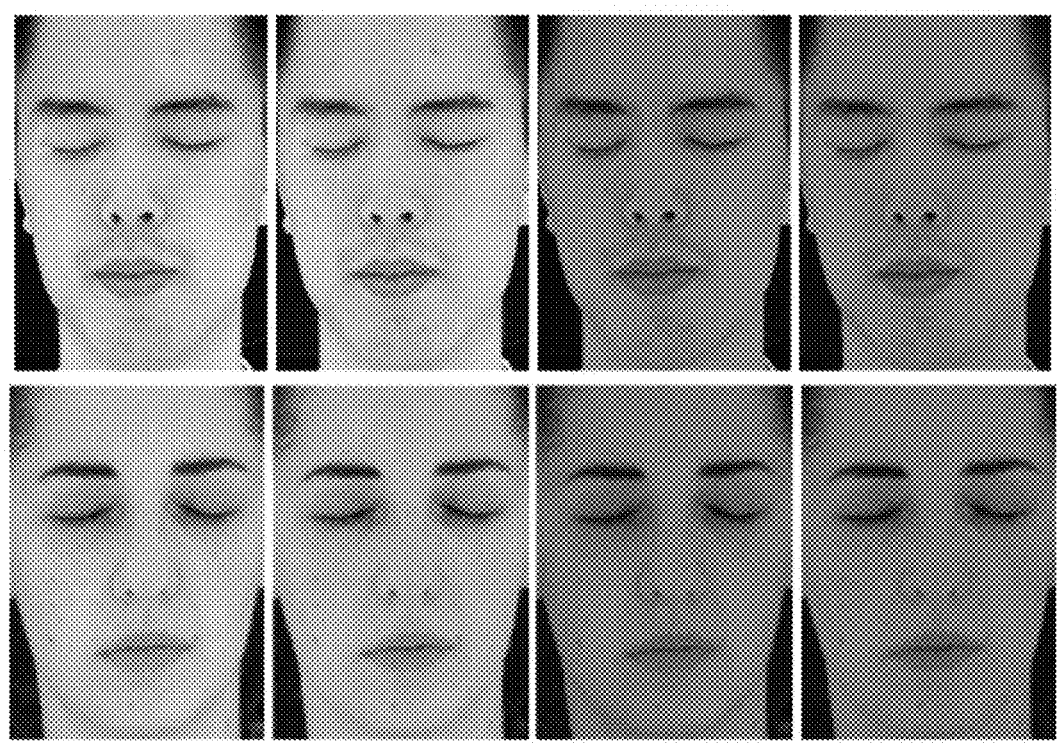
| $D65'$ photo | $D65'$ recon. | $W27$ photo | $W27$ recon. |
|---|---|---|---|
| FIG.8E | FIG.8F | FIG.8G | FIG.8H |

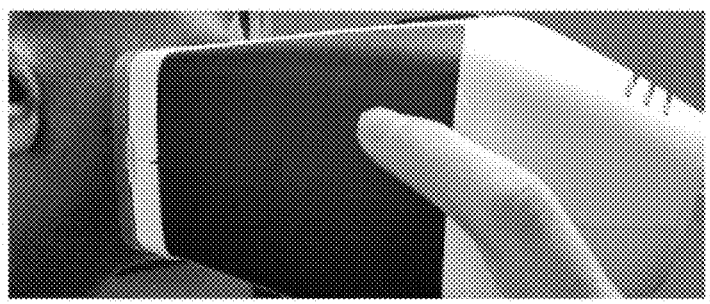
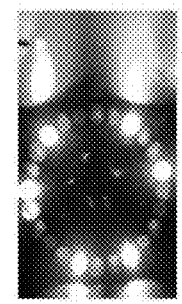
FIG.9D | FIG.9E
Color map | Redness map | Pigmentation map
FIG.9A | FIG.9B | FIG.9C
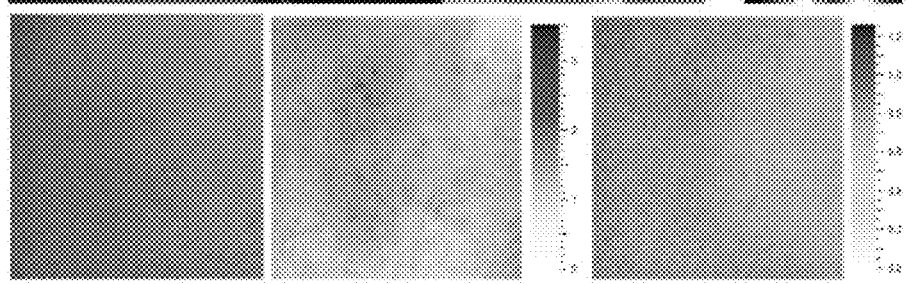
Antera albedo | 2D lookup | Augment. 4D | 4D search
FIG.10A | FIG.10B | FIG.10C | FIG.10D
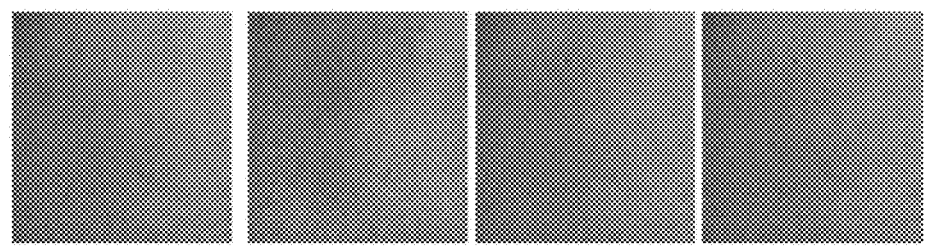
Antera $C_m$ | Antera $C_h$ | Augment. $\beta_m$ | Augment. $C_{he}$
FIG.10E | FIG.10F | FIG.10G | FIG.10H
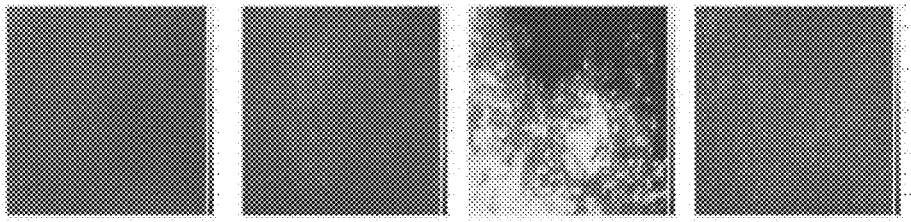
4D-search $C_m$ | 4D-search $C_h$ | 4D-search $\beta_m$ | 4D-search $C_{he}$
FIG.10I | FIG.10J | FIG.10K | FIG.10L
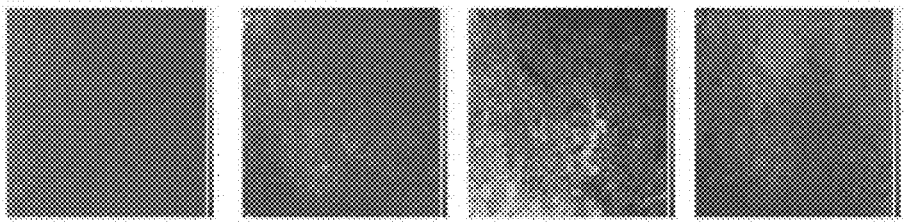

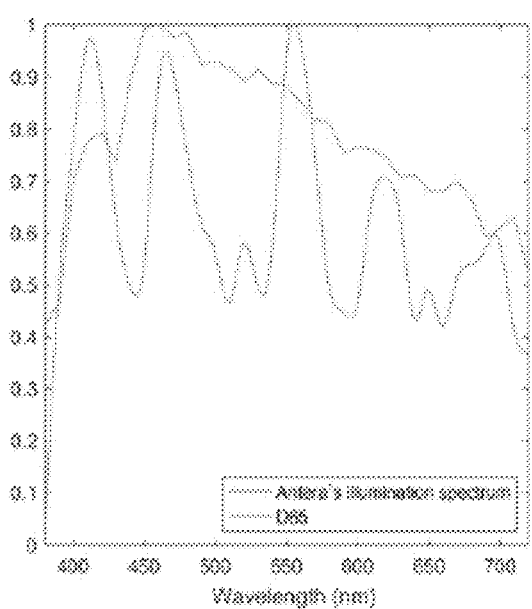 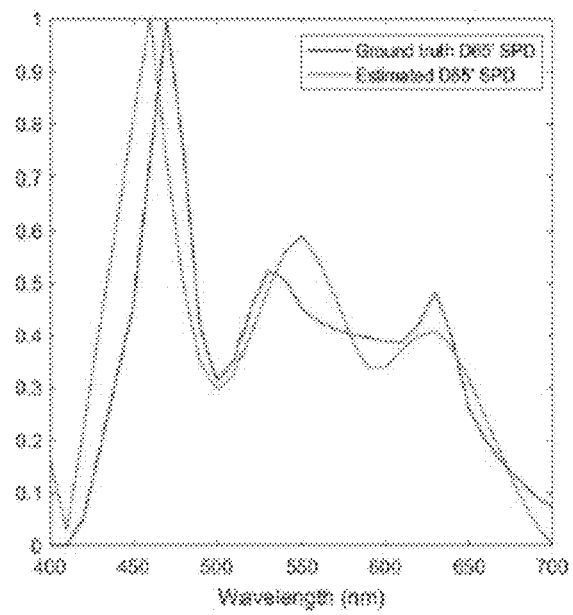
Estimated spectrum
FIG.11A
Validation
FIG.11B

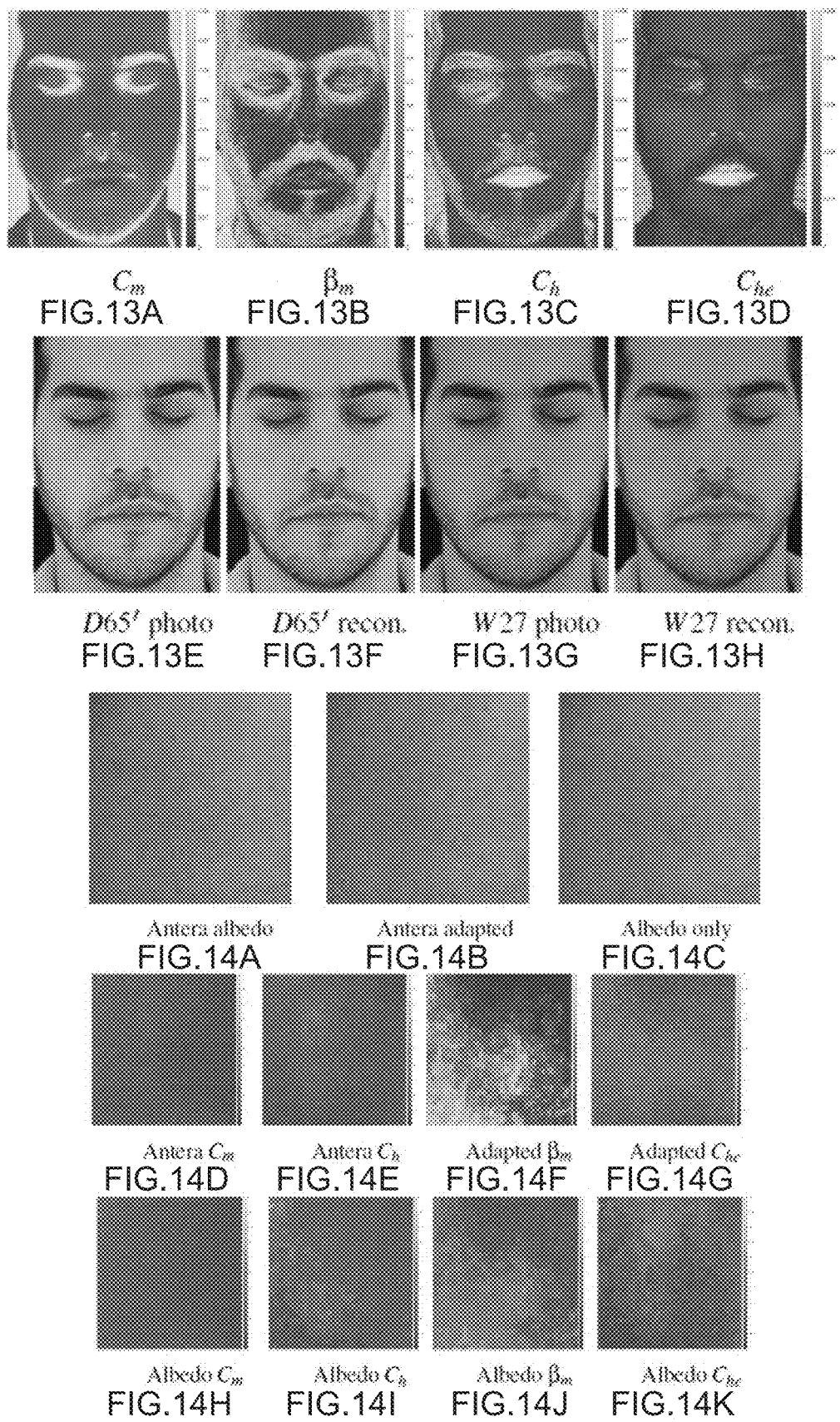

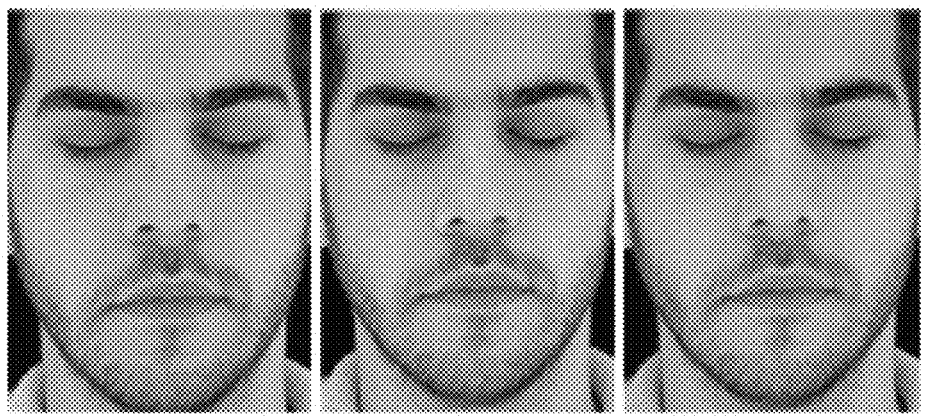
D65' + blue
FIG.15A
D65' photo
FIG.15B
W57 + blue
FIG.15C
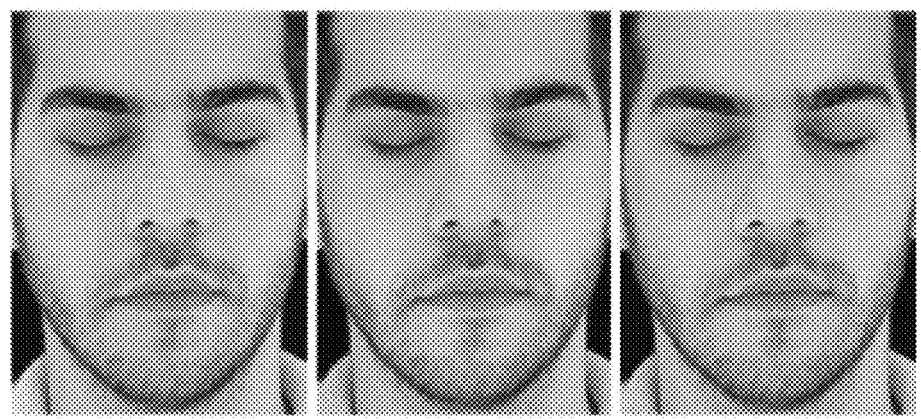
D65' + blue
FIG.15D
W57 photo
FIG.15E
W57 + blue
FIG.15F
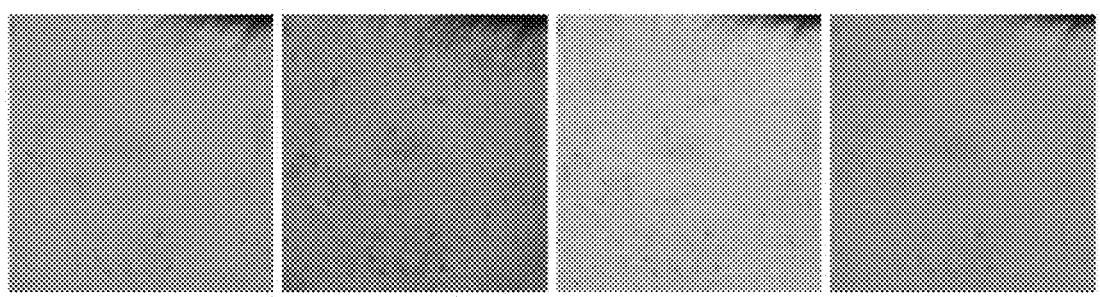
Original
FIG.16A
Sim. tanning
FIG.16B
Sim. drained
FIG.16C
Sim. flushed
FIG.16D

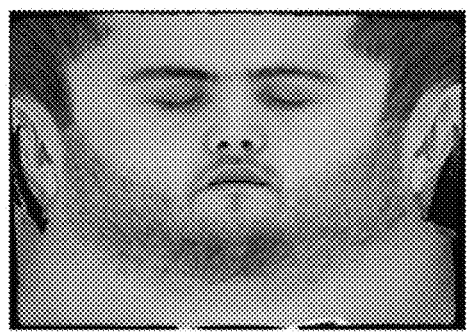
FIG.17A  $D65'$ texture
Synth. blue texture  FIG.17B
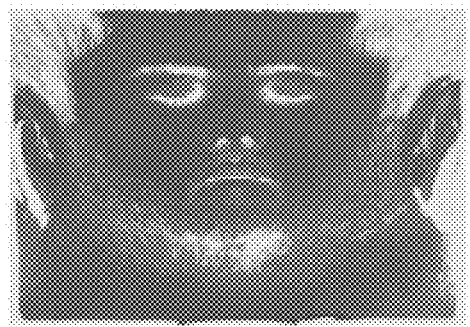
FIG.17C  $C_m$ map
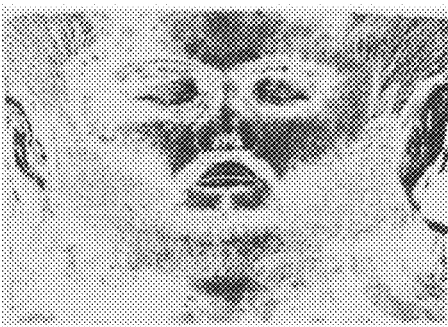
$\beta_m$ map  FIG.17D
FIG.17E  $C_h$ map
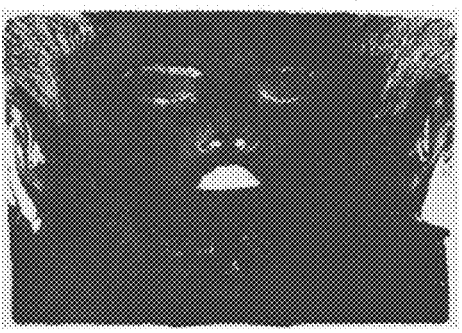
$C_{he}$ map  FIG.17F
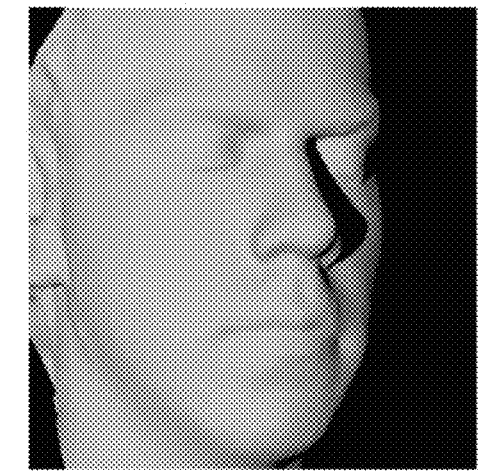
FIG.17G  Geometry
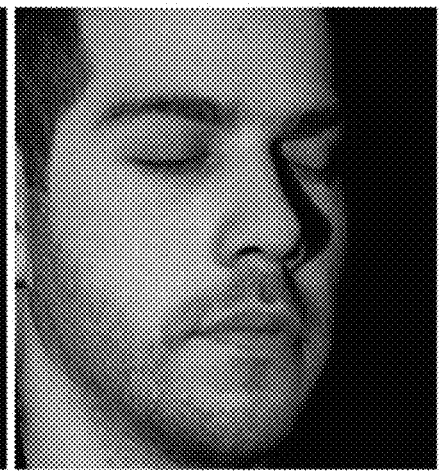
Rendering  FIG.17H

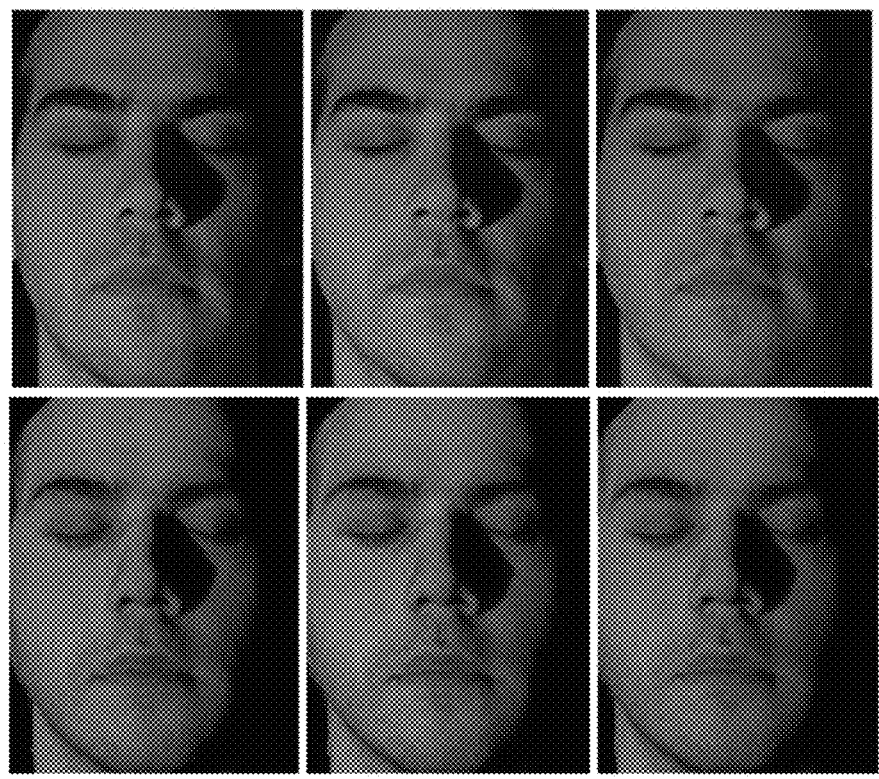
W57 FIG.18A  W40 FIG.18B  W27 FIG.18C
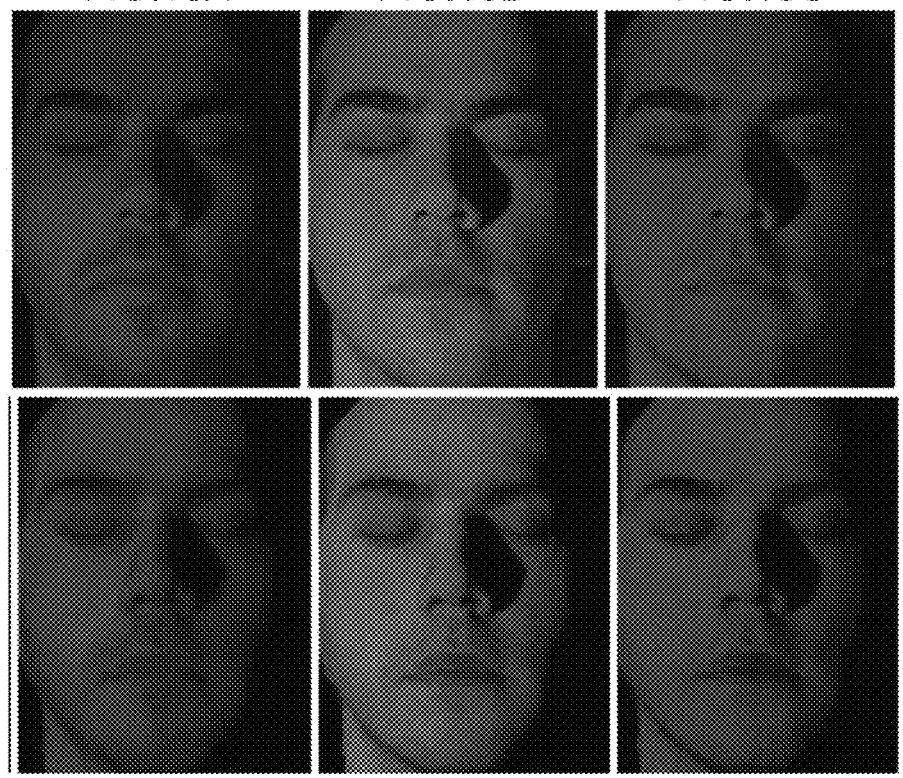
Red FIG.18D  Green FIG.18E  Blue FIG.18F

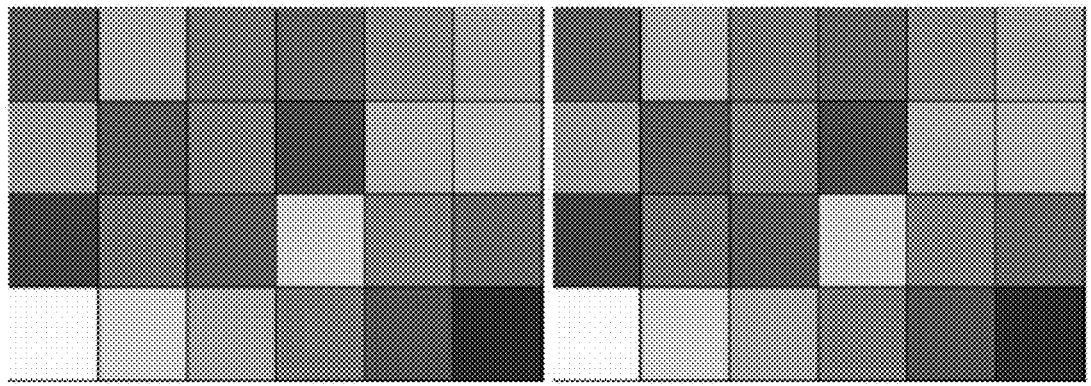
$D65'$, 6LEDs
FIG.19A
$D65^{W57}$
FIG.19B
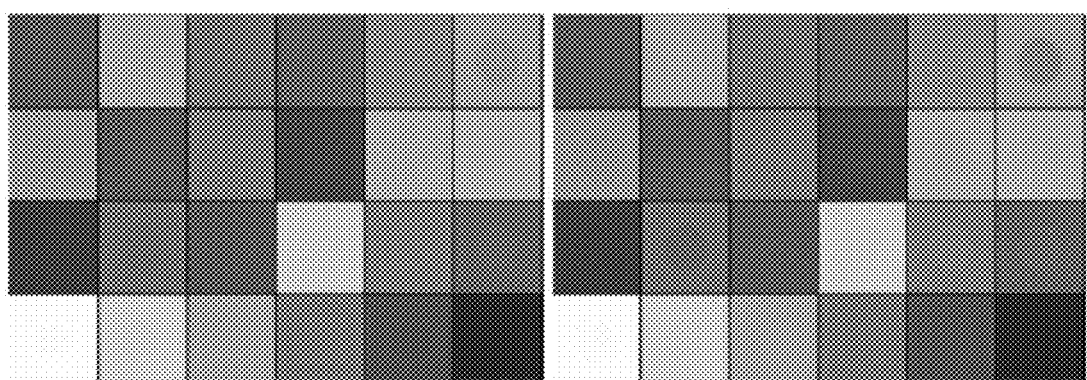
$D65^{W40}$
FIG.19C
$D65^{W27}$
FIG.19D 2D model　　　Photograph　　　4D model $C_m$　　　$\beta_m$　　　$C_h$　　　$C_{hv}$ W 57 photo　W 57 recon.　W 27 photo　W 27 recon.

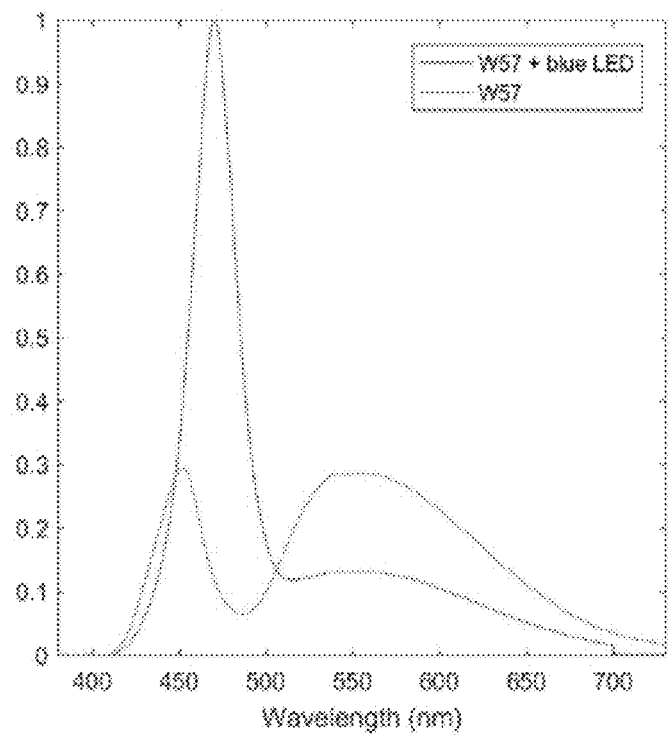
FIG.22
W57
FIG.23A
W57+ blue
FIG.23B
synth. image
FIG.23C
direct blue illum.
FIG.23D
direct blue isol.
FIG.23E
synth. blue isol.
FIG.23F

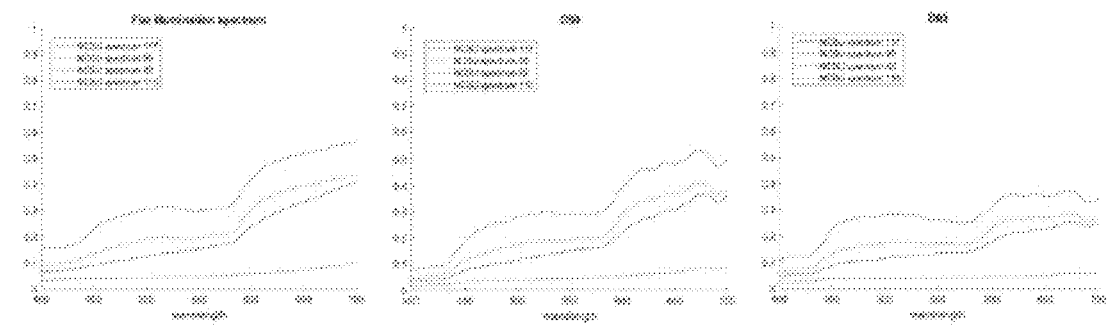
skin reflectance  
FIG.24A
D50 response  
FIG.24B
D65 response  
FIG.24C
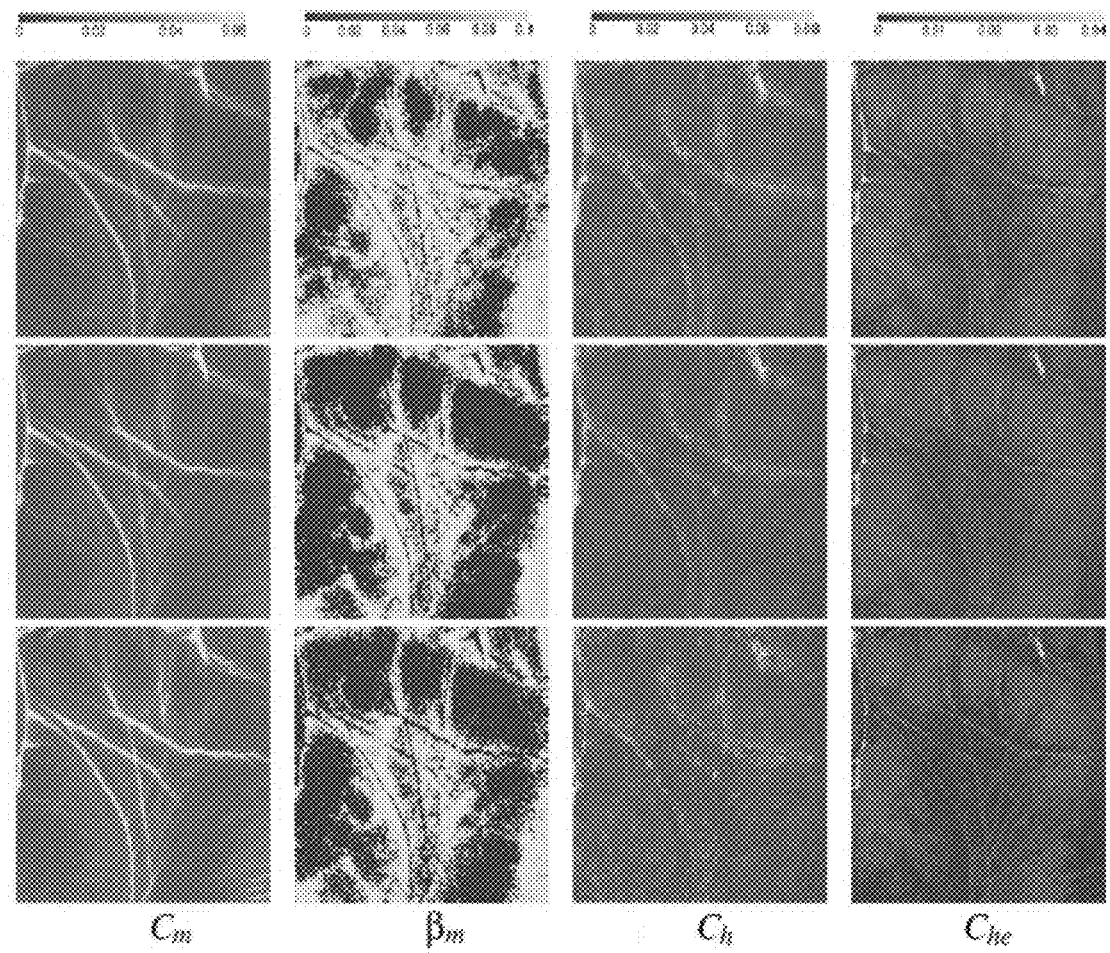
$C_m$  
FIG.25A
$\beta_m$  
FIG.25B
$C_h$  
FIG.25C
$C_{he}$  
FIG.25D

D65'     W57     W40     W27

$C_m$     $\beta_m$     $C_h$     $C_{he}$

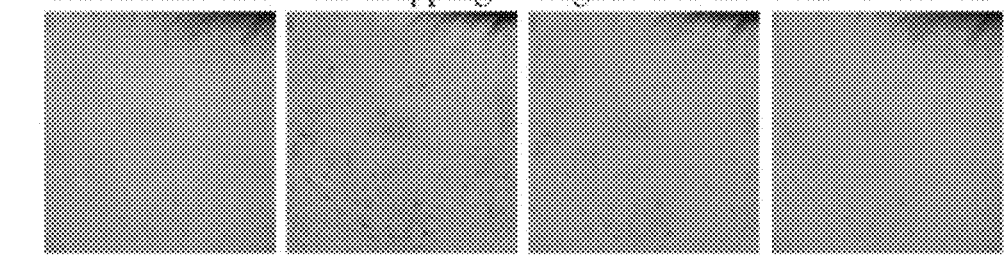
FIG.28A  Forehead (Caucasian)
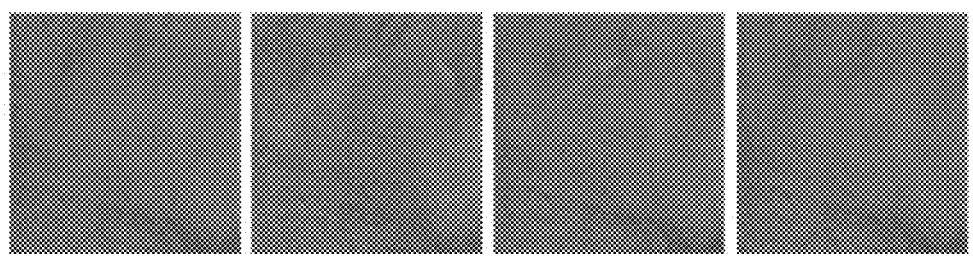
FIG.28B  Back of hand (South-Asian)
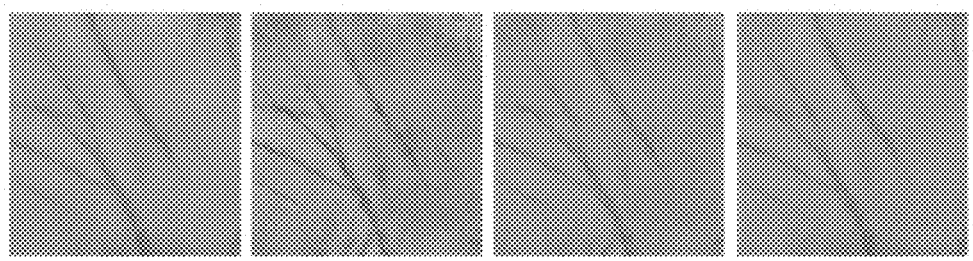
FIG.28C  Palm (South-Asian)
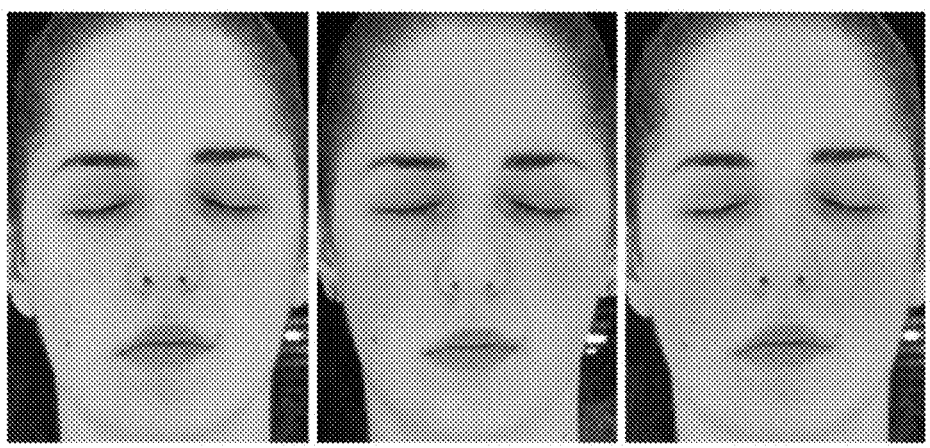
Photo 1 - normal   Photo 2 - flushed   Sim. flushing
FIG.29A            FIG.29B             FIG.29C

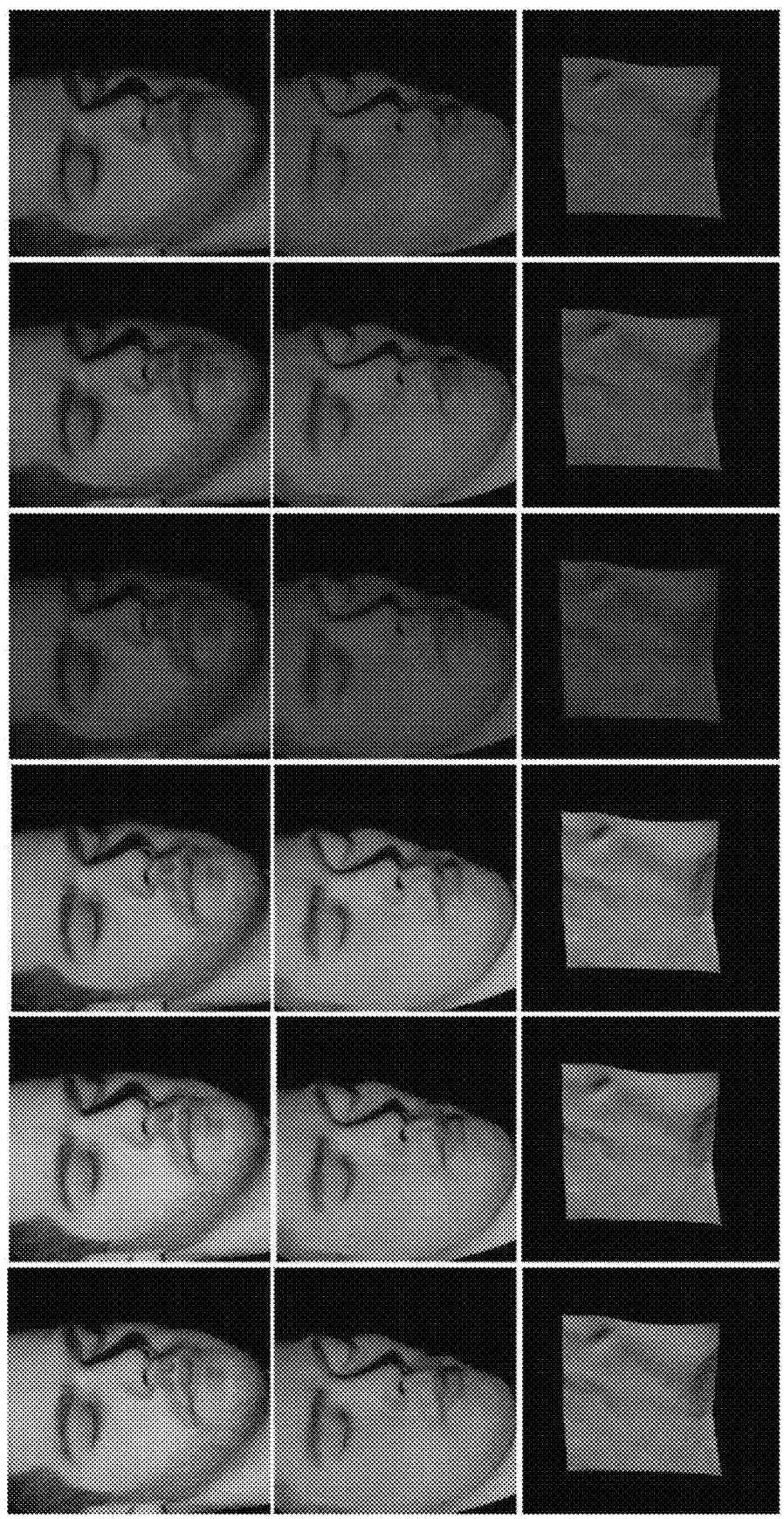
FIG.30A W57  FIG.30B W40  FIG.30C W27  FIG.30D Red  FIG.30E Green  FIG.30F Blue

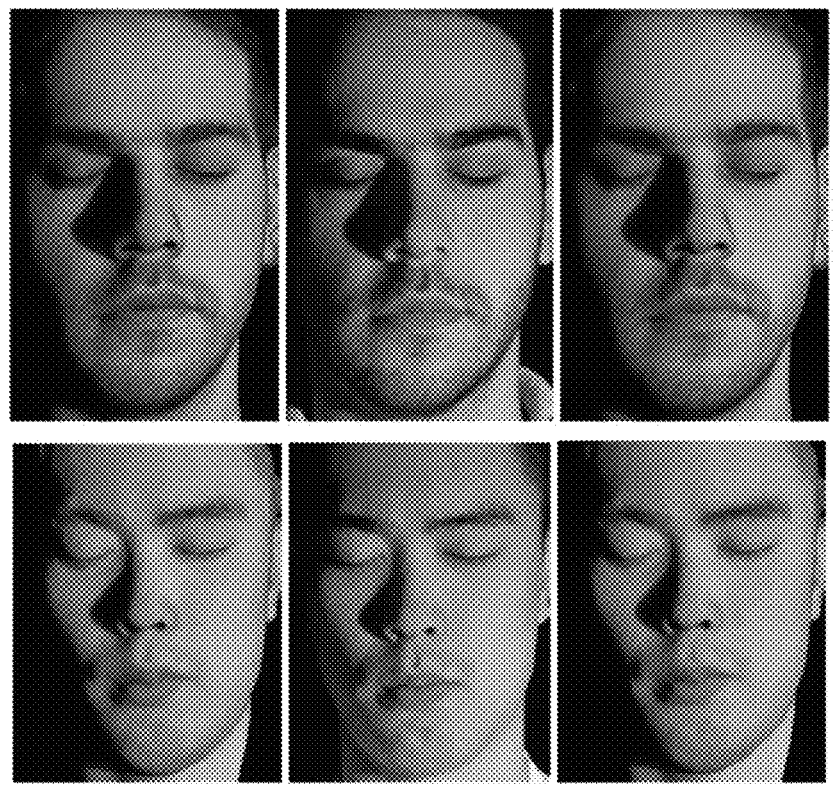
Rendering (*ibs'* + *blue*)
FIG.31A
Photograph
FIG.31B
Rendering (*ibs'* only)
FIG.31C
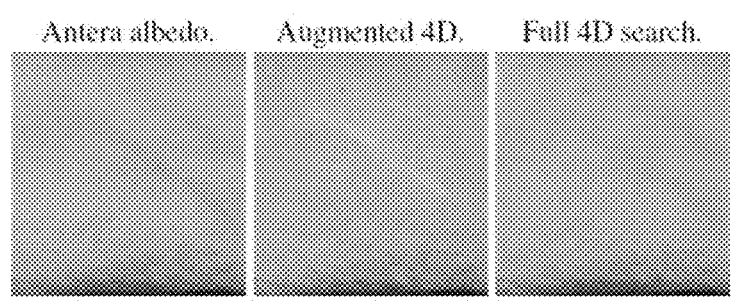
Antera albedo.   Augmented 4D.   Full 4D search.
FIG.32A
Inner forearm (Caucasian)
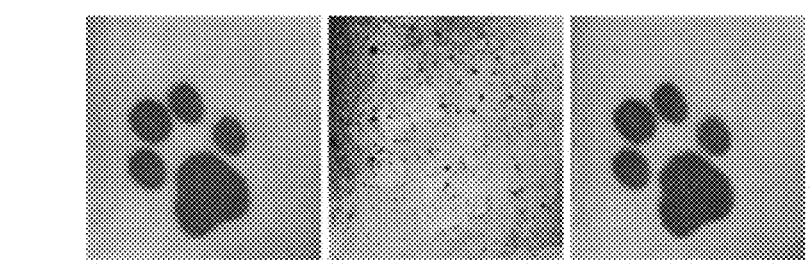
FIG.32B
Tattoo

IMAGE CAPTURE AND PROCESSING

CROSS-REFERENCE TO RELATED APPLICATIONS

This application claims the benefit of priority under 35 U.S.C. § 119(a) and § 365(b) to British patent application No. GB 2010191.1 filed Jul. 2, 2020, the contents of each of which are herein incorporated by reference in their entirety.

FIELD

The present invention relates to processing images to obtain parameters for modelling and rendering spectral skin reflectance. The present invention also relates to improved methods for obtaining enough images to extract parameters for modelling and rendering spectral skin reflectance.

BACKGROUND

References

[AS17] ALOTAIBI S., SMITH W. A. P.: A biophysical 3d morphable model of face appearance. In 2017 IEEE International Conference on Computer Vision Workshops, ICCV Workshops 2017, Venice, Italy, Oct. 22-29, 2017 (2017), pp. 824-832. 3

[BCF01] BARNARD K., CIUREA F., FUNT B.: Sensor sharpening for computational color constancy. Journal of the Optical Society of America. A, Optics, image science, and vision 18 (December 2001), 2728-43. 3

[BS10a] BIANCO S., SCHETTINI R.: Two new von kries based chromatic adaptation transforms found by numerical optimization. Color Research & Application 35, 3 (2010), 184-192. 15

[BS10b] BRAINARD D. H., STOCKMAN A.: Colorimetry. McGraw Hill, 2010. 15

[CBKM15] CHEN T. F., BARANOSKI G. V. G., KIMMEL B. W., MI RANDA E.: Hyperspectral modeling of skin appearance. ACM Trans. Graph. 34, 3 (May 2015), 31:1-31:14. 2, 3

[CCH99] COTTON S. D., CLARIDGE E., HALL P. N.: A skin imaging method based on a colour formation model and its application to the diagnosis of pigmented skin lesions. In Proceedings of Medical Image Understanding and Analysis '99 (1999), pp. 49-52. 3

[CXW19] CHAUHAN T., XIAO K., WUERGER S.: Chromatic and luminance sensitivity for skin and skinlike textures. Journal of Vision 19, 1 (2019). 5

[DJ05] DONNER C., JENSEN H. W.: Light diffusion in multi-layered translucent materials. ACM Transactions on Graphics (TOG) 24, 3 (2005), 1032-1039. 2, 11

[DJ06] DONNER C., JENSEN H. W.: A spectral bssrdf for shading human skin. In Proceedings of the 17th Eurographics Conference on Rendering Techniques (Aire-la-Ville, Switzerland, Switzerland, 2006), EGSR '06, Eurographics Association, pp. 409-417. 2, 11

[DWd*08] DONNER C., WEYRICH T., D'EON E., RAMAMOORTHI R., RUSINKIEWICZ S.: A layered, heterogeneous reflectance model for acquiring and rendering human skin. ACM Transactions on Graphics (TOG) 27, 5 (December 2008), 140:1-140:12. 2, 3, 10, 11, 12

[GFT*11] GHOSH A., FYFFE G., TUNWATTANAPONG B., BUSCH J., YU X., DEBEVEC P.: Multiview face capture using polarized spherical gradient illumination. ACMT ransactions on Graphics (TOG) 30, 6 (2011), 129. 4

[GHP*08] GHOSH A., HAWKINS T., PEERS P., FREDERIKSEN S., DEBEVEC P.: Practical modeling and acquisition of layered facial reflectance. ACM Trans. Graph. 27, 5 (December 2008), 139:1-139:10. 2

[Gua03] GUANG-BIN HUANG: Learning capability and storage capacity of two-hidden-layer feedforward networks. IEEE Transactions on Neural Networks 14, 2 (March 2003), 274-281. 9

[GZAK00] GILLIES R., ZONIOS G., ANDERSON R., KOLLIAS N.: Fluorescence excitation spectroscopy provides information about human skin in vivo. Journal of Investigative Dermatology 115, 4 (2000). 12

[IGAJG15] IGLESIAS-GUITIAN J. A., ALIAGA C., JARABO A., GUTIERREZ D.: A biophysically-based model of the optical properties of skin aging. Comput. Graph. Forum 34, 2 (May 2015), 45-55. 2, 3

[INN07] IGARASHI T., NISHINO K., NAYAR S. K.: The appearance of human skin: A survey. Found. Trends. Comput. Graph. Vis. 3, 1 (January 2007), 1-95. 2

[JMLH01] JENSEN H. W., MARSCHNER S., LEVOY M., HANRAHAN P.: A practical model for subsurface light transport. In In Proceedings of ACM SIGGRAPH (2001), pp. 511-518. 2

[JSB*10] JIMENEZ J., SCULLY T., BARBOSA N., DONNER C., ALVAREZ X., VIEIRA T., MATTS P., ORVALHO V., GUTIERREZ D., WEYRICH T.: A practical appearance model for dynamic facial color. ACM Transactions on Graphics (TOG) 29, 6 (December 2010), 141:1-141:10. 2, 3, 4, 10

[JSG09] JIMENEZ J., SUNDSTEDT V., GUTIERREZ D.: Screen-space perceptual rendering of human skin. ACM Transactions on Applied Perception 6, 4 (2009), 23:1-23:15. 3

[KB04] KRISHNASWAMY A., BARANOSKI G. V. G.: A biophysically-based spectral model of light interaction with human skin. Comput. Graph. Forum 23 (2004), 331-340. 3

[KRP*15] KLEHM O., ROUSSELLE F., PAPAS M., BRADLEY D., HERY C., BICKEL B., JAROSZ W., BEELER T.: Recent advances in facial appearance capture. Computer Graphics Forum (CGF) 34, 2 (May 2015), 709-733. 2

[LWA*18] LINMING F., WEI H., ANQI L., YUANYU C., HENG X., SUSHMITA P., YIMING L., LI L.: Comparison of two skin imaging analysis instruments: The visia from canfield vs the antera 3d cs from miravex. Skin Research and Technology 24, 1 (2018), 3-8. 7

[LYL*16] LEGENDRE C., YU X., LIU D., BUSCH J., JONES A., PATTANAIK S., DEBEVEC P.: Practical multispectral lighting reproduction. ACM Trans. Graph. 35, 4 (July 2016), 32:1-32:11. 3, 14

[Mac92] MACKAY D. J. C.: Bayesian interpolation. Neural Computation 4, 3 (1992), 415-447. 9

[MFCN15] MATIAS A. R., FERREIRA M., COSTA P., NETO P.: Skin colour, skin redness and melanin biometric measurements: comparison study between antera 3d, exameter and colorimeter. Skin Research and Technology 21, 3 (2015), 346-362. 7

[PC04] PREECE S., CLARIDGE E.: Spectral filter optimization for the recovery of parameters which describe human skin. IEEE Transactions on Pattern Analysis and Machine Intelligence 26, 7 (2004), 913-922. 3, 5

[PH10] PHARR M., HUMPHREYS G.: *Physically Based Rendering: From Theory to Implementation*. Morgan Kaufman, 2010. 10

[PLGN07] PARK J., LEE M., GROSSBERG M. D., NAYAR S. K.: Multi-spectral imaging using multiplexed illumination. In *Proceedings of IEEE International Conference on Computer Vision (ICCV)* (2007). 3

[SF16] SCHÖNBERGER J. L., FRAHM J.-M.: Structure-from-motion revisited. In *Conference on Computer Vision and Pattern Recognition (CVPR)* (2016). 11

[SZPF16] SCHÖNBERGER J. L., ZHENG E., POLLEFEYS M., FRAHM J.-M.: Pixelwise view selection for unstructured multi-view stereo. In *European Conference on Computer Vision (ECCV)* (2016). 11

[TOS*03] TSUMURA N., OJIMA N., SATO K., SHIRAISHI M., SHIMIZU H., NABESHIMA H., AKAZAKI S., HORI K., MIYAKE Y.: Image-based skin color and texture analysis/synthesis by extracting hemoglobin and melanin information in the skin. *ACM Trans. Graph.* 22, 3 (July 2003). 3

[Tuc07] TUCHIN V.: *Tissue Optics: Light Scattering Methods and Instruments for Medical Diagnosis*, vol. PM166. The International Society for Optics and Photonics (SPIE), 2007. 2

[WHD03] WENGER A., HAWKINS T., DEBEVEC P.: Optimizing color matching in a lighting reproduction system for complex subject and illuminant spectra. In *Proceedings of the 14th Eurographics Workshop on Rendering* (2003), EGRW '03, pp. 249-259. 3

[WLL*09] WEYRICH T., LAWRENCE J., LENSCH H. P. A., RUSINKIEWICZ S., ZICKLER T.: Principles of appearance acquisition and representation. *Found. Trends. Comput. Graph. Vis.* 4, 2 (February 2009), 75-191. 2

[WMP*06] WEYRICH T., MATUSIK W., PFISTER H., BICKEL B., DONNER C., TU C., MCANDLESS J., LEE J., NGAN A., JENSEN H. W., GROSS M.: Analysis of human faces using a measurement-based skin reflectance model. *ACM Transactions on Graphics (TOG)* 25, 3 (July 2006), 1013-1024. 2

[WS82] WYSZECKI G., STILES W. S.: *Color science: Concepts and Methods, Quantitative Data and Formulae*, vol. 8. Wiley, New York, N.Y., USA, 1982. 14

[YSJR17] YAN L.-Q., SUN W., JENSEN H. W., RAMAMOORTHI R.: A bssrdf model for efficient rendering of fur with global illumination. *ACM Trans. Graph.* 36, 6 (November 2017). 8

INTRODUCTION

Accurate modeling and rendering of human skin appearance has been a long standing goal in computer graphics. Of particular importance has been the realistic modeling and rendering of layered reflectance and subsurface scattering in skin for which researchers have proposed various diffusion-based models [JMLH01, DJ05] and measurement techniques [WMP*06, GHP*08]. Recently, various bio-physical models of skin appearance have been proposed, mostly based on the spectral distribution of chromophores in the epidermal and deeper dermal layers of skin [DJ06, DWd*08, CBKM15, IGAJG15]. However, measurement of the spectral parameters of absorption and scattering of light in skin for such bio-physical models has been a challenge in computer graphics. Previous works have either borrowed parameters from tissue-optics literature [Tuc07], or employed extensive multispectral imaging for inverse rendering detailed spatially varying parameters for a patch of skin [DWd*08]. Closest to our approach, Jimenez et al. [JSB*10] employed observations under uniform broadband illumination to estimate two dominant parameters of melanin and hemoglobin concentrations for driving a qualitative appearance model for facial animation.

2. PREVIOUS WORK

We restrict the discussion here to the most relevant previous work in graphics and vision on modeling and measurement of spectral skin appearance. We refer the interested reader to recent surveys for a broader review of skin [INN07] and facial appearance [WLL*09, KRP*15] modeling.

Bio-physical Skin Appearance Modeling: The seminal work of Jensen et al. [JMLH01] first introduced efficient BSSRDF modeling for highly translucent materials in computer graphics using dipole diffusion. Donner & Jensen [DJ05] extended this work with the introduction of multi-layered diffusion using the multipole model for modeling layered scattering in human skin, borrowing RGB scattering and absorption parameters for the various layers of skin from tissue optics literature [Tuc07]. They subsequently proposed a diffusion based spectral skin BSSRDF model [DJ06] that was well suited for artistic modeling of skin appearance using intuitive parameters which directly control skin coloration. Importantly, their model simplified the skin layers into two primary layers: epidermis and dermis, with parameters corresponding to respective chromophore concentrations. This spectral BSSRDF model has been the basis of significant follow-up work: Donner et al. [DWd*08] further extended the model with a more detailed set of parameters including epidermal hemoglobin fraction and inter-layer absorption, and simulated truly heterogeneous subsurface scattering in skin using a path-tracing framework. Jimenez et al. [JSB*10] simplified the detailed model of [DWd*08] to make it suitable for practical measurement and modeling of qualitative change in skin appearance during facial performance/animation. We build upon the work of Jimenez et al. which has a similar focus on a practical technique. However, their proposed reduced model for facial animation only has the two dominant parameters of melanin $C_m$ and hemoglobin $C_h$ concentration as free parameters which we show to be insufficient for matching the spatial variation of facial skin. Furthermore, Jimenez et al. focus on modeling local changes in albedo color due to blood flow, while employing a fixed translucency parameter over the entire face in order to support real-time rendering with screen-space subsurface scattering [JSG09]. Besides reconstructing the albedo color with higher accuracy using their extended model with four parameters, we also render heterogeneous subsurface scattering in skin using spatially varying diffusion profiles which are precomputed from the estimated parameters. Importantly, we do not employ a modulation texture for rendering, but reconstruct skin color variation through the subsurface scattering process.

There have been a few alternate notable works in computer graphics on detailed bio-physical modeling of skin including the BioSpec [KB04] and the more recent Hyperspectral [CBKM15] models of skin appearance, as well as recently proposed bio-physical model of skin ageing [IGAJG15]. While highly accurate in the extent of bio-physical simulation of skin appearance due to various physiological factors, these models are rather complex for inverse rendering for driving these models from measurements. Hence, in this work we focus on a simpler diffusion-based spectral model of skin for estimating model parameters from measurements.

Spectral Skin Appearance Measurement: While there has been significant work in graphics and vision on standard RGB measurement of skin reflectance, there have been fewer works focused on spectral measurement of skin. Tsumura et al. [TOS*03] proposed applying independent component analysis on regular facial images to estimate melanin and hemoglobin maps for physiologically motivated image-based editing effects. Donner et al. [DWd*08] were the first to carry out extensive multispectral imaging of skin patches for driving their detailed heterogeneous model of skin reflectance. Their setup involved a broadband flash incident on a patch of skin while a camera equipped with a spectral filter wheel records nine different chosen narrow spectral bands of reflectance. The acquired spectral measurements are thereafter employed in an inverse rendering pipeline for model parameter estimation. While enabling highly accurate estimation of the detailed spectral parameters of skin reflectance, the approach is limited to imaging a skin patch and is not well suited for facial acquisition. Hence, Jimenez et al. [JSB*10] employed just a single measurement with a color camera under uniform broadband (flash) illumination to estimate spatially varying parameters of melanin and hemoglobin concentrations over a face, and more specifically local changes in hemoglobin concentrations during facial performance, using the measurement procedure of [CCH99]. A similar measurement procedure utilizing broadband LED illumination has also been employed by [AS17] to estimate melanin and hemoglobin concentrations over a face for building a biophysical morphable model of skin appearance. Compared to these works that employ just broadband illumination measurements, we demonstrate that spectral parameter estimation of skin can be improved using a combination of two complimentary spectral measurements involving both broadband and narrow band (blue) illumination, while still being well suited for practical facial capture. We also demonstrate how to acquire ideal broad- and narrow-band measurements for skin with a regular color camera and LED illumination.

Also related to our work is that of LeGendre et al. [LYL*16] and Wenger et al. [WHD03] who employ multispectral LED illumination for improving image-based lighting reproduction. While the focus of these works is on matching the appearance of a subject under a specific lighting condition, our focus is on spectral parameter estimation of skin in order to reproduce its appearance under any desired spectral illumination. Our spectral acquisition procedure with LED illumination has some similarity to the multiplexed illumination approach proposed by Park et al. [PLGN07]. However, Park et al. focused on optimal spectral estimation of general scene reflectance using an optimization procedure based on a color chart, whereas we specifically design our two complementary illumination conditions based on the response of a spectral skin BSSRDF model and hence achieve better matching of skin appearance under different spectral lighting conditions. Our proposed choice of the additional narrow band measurement is also supported by a previous study on optimal spectral filter selection for skin by Preece & Claridge [PC04]. However, instead of direct measurement of skin under narrow band (blue LED) illumination which produces some colors outside the gamut of a regular color camera, we directly only measure skin response to a mixture of narrowband and broadband illumination, and afterwards computationally separate the desired narrowband response from the mixture. We note that this process bears some conceptual similarity to sensor sharpening approaches employed for color constancy [BCF01]. We demonstrate higher quality descattered measurement with this proposed indirect measurement of skin response to narrowband illumination. Besides optimal spectral measurements for facial acquisition, we also demonstrate how to adapt practical skin patch measurements obtained with a hand-held dermatological imaging device for photorealistic skin appearance reconstruction and rendering.

SUMMARY

According to a first aspect of the invention, there is provided a method of image processing, including receiving a first image of human skin. The first image corresponds to a first, uniform broadband illumination condition. The method also includes receiving a second image which has the same field of view and contents as the first image. The second image corresponds to a second illumination condition which comprises a uniform narrowband illumination condition. The method also includes processing the first and second images to fit parameter maps for a spectral bidirectional scattering surface reflectance distribution function skin model. The parameter maps include a modelled melanin concentration, a modelled haemoglobin concentration, a modelled melanin blend-type fraction and a modelled epidermal haemoglobin fraction. At least three of the parameter maps are independent.

Narrowband illumination may extend for 100 nm to either side of a central wavelength. Narrowband illumination may extend for 50 nm to either side of a central wavelength. Narrowband illumination may extend for less than 50 nm, to either side of a central wavelength. The method may be computer implemented. The method may be executed by one or more digital electronic processors.

Melanin blend fraction corresponds to the mixture fraction of two types of melanin in human skin and hair—eumelanin and pheomelanin, which gives rise to differences in skin and hair color.

Epidermal hemoglobin fraction in the employed skin model relates to approximating factors such as difference in thickness of epidermis (like in lips) or the presence of blood in upper papillary dermis (for example in flushed areas of skin such as cheeks).

All of the parameter maps may be independent.

The uniform narrowband illumination condition may correspond to a blue narrowband illumination condition. Blue narrowband illumination may peak at a central wavelength in the range between about 450 nm and about 485 nm.

The second illumination condition may consist of the uniform narrowband illumination condition.

The second illumination condition may include the uniform narrowband illumination condition superposed with the uniform broadband illumination condition.

Processing the first and second images to fit parameter maps may include generating a narrowband illumination image based on the first and second images, and processing the first image and the narrowband illumination image to fit the parameter maps for the spectral bidirectional scattering surface reflectance distribution function model.

The narrowband illumination image may be determined by taking a difference of the first and second images. The narrowband illumination image may correspond to the red channel, the green channel, or the blue channel of the difference of the first and second images.

The narrowband illumination image may be a synthesized image determined based on applying a transform to the first and second images. The narrowband illumination image may correspond to the red channel, the green channel, or the blue channel of the synthesized image. The transform may include a chromatic adaptation transform (CAT). The transform may include the chromatic adaptation transform (CAT) described in Appendix B hereinafter.

The method may also include receiving first spectral data corresponding to the uniform broadband illumination condition and second spectral data corresponding to the second illumination condition.

The method may also include receiving a third image of a colour test card, the third image corresponding to the uniform broadband illumination condition. The method may also include determining first spectral data corresponding to the broadband illumination condition based on the third image. The method may also include receiving a fourth image of the colour test card, the fourth image corresponding to the second illumination condition. The method may also include determining second spectral data corresponding to the second illumination condition based on the fourth image.

The method may include generating a narrowband calibration image based on the third and fourth images. The narrowband calibration image may be generated in the same way as the narrowband illumination image. The method may include determining narrowband spectral data based on the narrowband calibration image.

Processing the first and second images to fit parameter maps may include using a three-dimensional spectral look-up table or using a four-dimensional spectral look-up table. The spectral look-up table may be constructed based on spectral information comprising the first and second spectral data. The spectral information may also include the narrowband spectral data.

Processing the first and second images to fit parameter maps may include applying a neural network model to inputs including spectral information comprising the first and second spectral data. The inputs may also include the first image. The inputs may also include the second image and/or the narrowband illumination image. A final stage of the neural network may output an output RGB albedo image. The neural network may be configured to determine the parameter maps which minimise differences between the output RGB albedo image and the first image.

The spectral information may also include the narrowband spectral data. In some examples the neural network model may be trained separately for different desired spectral lighting conditions, for example cold spectrum vs warm spectrum.

The neural network model may include, or take the form of, a cascaded neural network. Each stage prior the final stage may determine one of the parameter maps and provide that parameter map as input to the subsequent stage. The cascaded neural network may take the form of a cascaded multi-layer perceptron.

The cascaded neural network may be configured to determine the parameter map corresponding to the modelled melanin concentration as a first stage. The cascaded neural network may be configured to determine the parameter map corresponding to the modelled melanin blend-type fraction as a second stage. The cascaded neural network may be configured to determine the parameter map corresponding to the modelled epidermal haemoglobin fraction as a third stage. The cascaded neural network may be configured to determine the parameter map corresponding to the modelled haemoglobin concentration as a fourth stage.

According to a second aspect of the invention, there is provided a method including receiving an albedo image showing human skin. The method also includes processing the albedo image to fit parameter maps for a spectral bidirectional scattering surface reflectance distribution function skin model. The parameter maps include a modelled melanin concentration, a modelled haemoglobin concentration, a modelled melanin blend-type fraction and a modelled epidermal haemoglobin fraction. At least three of the parameter maps are independent.

The method may be computer implemented. The method may be executed by one or more digital electronic processors.

All of the parameter maps may be independent.

The method may also include receiving spectral data corresponding to an illumination condition used to obtain the albedo image.

The method may also include receiving a calibration image of a colour test card, the calibration image corresponding to the illumination condition. The method may also include determining spectral data corresponding to the illumination condition based on the calibration image.

Processing the albedo image to fit parameter maps may include using a three-dimensional spectral look-up table or using a four-dimensional spectral look-up table. The spectral look-up table may be constructed based on the spectral data.

The method may also include receiving a first input parameter map related to melanin concentration and corresponding to the albedo image. The method may also include receiving a second input parameter map related to haemoglobin concentration and corresponding to the albedo image. Processing the albedo image to fit parameter maps may include processing the albedo image to fit first and second intermediate parameter maps for a two parameter spectral bidirectional scattering surface reflectance distribution function skin model. The first intermediate parameter map may include an intermediate melanin concentration and the second intermediate parameter map may include an intermediate haemoglobin concentration, the intermediate parameter maps may be determined using a first two-dimensional spectral look up table constructed based on the spectral data. Processing the albedo image to fit parameter maps may include re-scaling the first and second input parameter maps based on the intermediate parameter maps. Processing the albedo image to fit parameter maps may include setting the parameter map corresponding to the modelled melanin concentration equal to the re-scaled first input parameter map. Processing the albedo image to fit parameter maps may include setting the parameter map corresponding to the modelled haemoglobin concentration equal to the re-scaled second input parameter map. Processing the albedo image to fit parameter maps may include processing the albedo image to fit the parameter maps corresponding to the modelled melanin blend-type fraction and the modelled epidermal haemoglobin fraction. The parameter maps may be determined using a second two-dimensional spectral look up table constructed based on the spectral data.

The first input parameter map related to melanin concentration may correspond to, for example, pigmentation. The second input parameter map related to haemoglobin may correspond, for example, to redness.

The second two-dimensional spectral look up table may take the form of a two-dimensional slice of a four-dimensional spectral look up table suitable for determining the parameter maps for the spectral bidirectional scattering surface reflectance distribution function skin model.

Re-scaling the first and second input parameter maps based on the intermediate parameter maps may include scaling the first input parameter map to match the mean and variance of the first intermediate parameter map. Re-scaling the first and second input parameter maps based on the intermediate parameter maps may include scaling the second input parameter map to match the mean and variance of the second intermediate parameter map.

Processing the albedo image to fit parameter maps may include applying a neural network model to inputs including the albedo image and the spectral data. A final stage of the neural network may output an output RGB albedo image. The neural network may be configured to determine the parameter maps which minimise differences between the output RGB albedo image and the albedo image.

The method may also include receiving a first input parameter map related to melanin concentration and corresponding to the albedo image. The method may also include receiving a second input parameter map related to haemoglobin concentration and corresponding to the albedo image. Processing the albedo image to fit parameter maps may include applying a neural network model to inputs including the albedo image, the first input parameter map, the second input parameter map, and the spectral data. A final stage of the neural network may output an output RGB albedo image. The neural network may be configured to determine the parameter maps which minimise differences between the output RGB albedo image and the albedo image.

The neural network model may include, or take the form of, a cascaded neural network. Each stage prior to the final stage may determines one of the parameter maps and provides that parameter map as input to the subsequent stage. The cascaded neural network may take the form of a cascaded multi-layer perceptron.

The cascaded neural network may be configured to determine the parameter map corresponding to the modelled melanin concentration as a first stage. The cascaded neural network may be configured to determine the parameter map corresponding to the modelled melanin blend-type fraction as a second stage. The cascaded neural network may be configured to determine the parameter map corresponding to the modelled epidermal haemoglobin fraction as a third stage. The cascaded neural network may be configured to determine the parameter map corresponding to the modelled haemoglobin concentration as a fourth stage.

According to a third aspect of the invention, there is provided a method including obtaining, using an RGB camera, a first image of a human skin surface under a first, uniform cross-polarized broadband illumination condition. The method also includes obtaining, using the RGB camera, a second image of the human skin surface under a second cross-polarized illumination condition. The second image which has the same field of view and contents as the first image. The second cross-polarized illumination condition includes a uniform narrowband illumination condition.

Narrowband illumination may extend for 100 nm to either side of a central wavelength. Narrowband illumination may extend for 50 nm to either side of a central wavelength. Narrowband illumination may extend for less than 50 nm, to either side of a central wavelength.

The uniform narrowband illumination condition may corresponds to a blue narrowband illumination condition. Blue narrowband illumination may peak at a central wavelength in the range between about 450 nm and about 485 nm.

The second cross-polarized illumination condition may consist of the uniform narrowband illumination condition.

The second cross-polarized illumination condition may include the uniform narrowband illumination condition superposed with the uniform cross-polarized broadband illumination condition.

The uniform cross-polarized broadband illumination condition may have a spectrum shifted towards blue wavelengths.

The uniform cross-polarized broadband illumination condition may have a colour spectrum corresponding to 6,500 K, or a metamer corresponding to 6,500 K. The uniform cross-polarized broadband illumination condition may have a colour spectrum corresponding to 5,700 K, or a metamer corresponding to 5,700 K. The uniform cross-polarized broadband illumination condition may have a colour spectrum corresponding to 4,000 K, or a metamer corresponding to 4,000 K. The uniform cross-polarized broadband illumination condition may have a colour spectrum corresponding to 2,700 K, or a metamer corresponding to 2,700 K. Preferably, colour spectrums corresponding to higher temperatures are preferred to colour spectrums corresponding to lower temperatures, as these may provide improved quality of the measurement and/or the parameter maps.

The uniform cross-polarized broadband illumination condition may be provided using only red, green, blue and/or white light emitting diodes. The relative intensities of each light emitting diode may be configured such that the overall illumination condition provides a metamer of a desired broadband illumination condition.

The method according to the third aspect may also include processing the first and second images according to the method of the first aspect.

According to a fourth aspect of the invention, there is provided apparatus including a plurality of light emitting diodes. The plurality of light emitting diodes include red, green, blue and/or white light emitting diodes. The apparatus is configured to drive some or all of the plurality of light emitting diodes with relative intensities such that an overall illumination condition output from the light emitting diodes provides a metamer of a desired broadband illumination condition.

The plurality of light emitting diodes may also include amber and/or cyan light emitting diodes.

The apparatus may be configured to drive some or all of the plurality of light emitting diodes with relative intensities such that an overall illumination condition output from the light emitting diodes provides a metamer of a broadband illumination condition having a colour spectrum corresponding to 6,500 K.

The apparatus may be configured such that an overall illumination condition output from the light emitting diodes provides a metamer of a broadband illumination condition having a colour spectrum corresponding to 5,700 K, 4,000K or 2,700K.

According to a fifth aspect of the invention, there is provided a method of calibrating the relative intensities of four or more different colours of light emitting diodes so as to provide a metamer of a desired broadband illumination condition. The light emitting diodes include red, green, blue and one or more colours of white light emitting diode. The method includes, for each colour of light emitting diode, illuminating a colour chart using only that colour, and obtaining, using an RGB camera, an image corresponding to that colour. The method also includes calculating, based on the images corresponding to each colour, the relative intensity of that colour necessary to provide a metamer of a desired broadband illumination condition.

The desired broadband illumination condition may have a colour spectrum corresponding to 6,500 K. The desired broadband illumination condition may have a colour spectrum corresponding to 5,700 K. The desired broadband illumination condition may have a colour spectrum corresponding to 4,000K. The desired broadband illumination condition may have a colour spectrum corresponding to 2,700K.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Certain embodiments of the present invention will now be described, by way of example, with reference to the accompanying drawings, in which:

FIG. 1A to FIG. 1C: Renderings of acquired faces (FIG. 1A, FIG. 1B) and a patch of skin (back of hand) using our proposed practical spectral measurement and reconstruction approaches. Spatially-varying spectral skin parameters for subject 1 (a, Mediterranean skin type), and subject 2 (FIG. 1B, Asian skin type) acquired using an LED sphere, while the back of the hand (FIG. 1C, South Asian skin type) has been acquired using a hand-held dermatological skin measurement device (Antera3D). Top-row: Renderings (using PBRT) with a spectral BSSRDF under a point source illumination with broadband D65 spectrum. Bottom-row: Diffuse-only renderings under six different LED spectras (W57, W40, W27, Red, Green, Blue).

FIG. 4A and FIG. 4B: (FIG. 4A) Spectral power distributions of the 6 different LEDs installed on the multispectral LED sphere. (FIG. 4B) Spectra of D65' and D65'+blue illumination, jointly used to isolate the blue response (Section 4.2).

FIG. 5A to FIG. 5F: Proposed practical spectral measurements of skin reflectance (FIG. 5A, FIG. 5B). (FIG. 5A) Broadband D65 metamer (D65') illumination. (FIG. 5B) Mix of D65'+blue LED illumination. (FIG. 5C) Synthesized response to pure blue LED illumination, and its isolated blue channel data (FIG. 5F) employed for parameter estimation. (FIG. 5D) Direct measurement of skin response to blue illumination, and its isolated blue channel data (FIG. 5E).

FIG. 6A and FIG. 6B: (FIG. 6A) The chromaticity of the narrow band blue LED lies outside both the sRGB ITU-R BT.709 and Adobe RGB colour spaces. Mixing the narrow band blue LED with a broadband illumination (D65' or W57) reports the chromaticity of the illumination within both gamuts. (FIG. 6B) Additional advantage is that the spectrum of the synthesized blue is narrower than the actual blue LED, contributing to sharp details correlated with melanin concentration.

FIG. 7A to FIG.7H: Estimated spectral parameters for subject's face (FIG. 7A to FIG. 7D), and comparison of photographs with reconstructions under D65' metamer broadband illumination (FIG. 7E, FIG. 7F), and warmer W27 LED illumination not employed for parameter estimation (FIG. 7G, FIG. 7H).

FIG. 8A to FIG. 8H: Estimated spectral parameters (FIG. 8A to FIG. 8D) for faces of two subjects with different skin types, and comparison (FIG. 8E TO FIG. 8H) of photographs with reconstructions under different types of broadband illumination. Measurement using D65' for broadband illumination.

FIG. 9A to FIG. 9E: Measurement of a subject's cheek with the Antera 3D® (FIG. 9D) and example of acquired chromophore maps (FIG. 9A to 9C). Photo-graph of the device's multi-LED illumination setup surrounding the camera lens (FIG. 9E).

FIG. 10A to FIG. 10L: Estimating skin patch parameters using Antera data. Parameters obtained by adapting and augmenting Antera's maps (FIG. 10E to FIG. 10H) exhibit higher physiological correlation and lower noise than parameters estimated using a full 4D search based on the albedo (FIG. 10I to 10L). However, reconstruction with the latter approach is a closer match to the albedo map.

FIG. 11A to FIG. 11B: (FIG. 11A) Spectrum of Antera's LEDs estimated using proposed genetic programming based optimization. (FIG. 11B) Validation of estimation procedure on D65' spectrum achieved with the LED sphere.

FIG. 13A to FIG. 13H: Spectral parameters for subject's face estimated by the cascaded feed-forward MLP (FIG. 13A to FIG. 13D). The bottom row shows comparison of photographs with reconstructions under D65' metamer broadband illumination (FIG. 13E, FIG. 13F), and warmer W27 LED illumination not employed for parameter estimation (FIG. 13G, FIG. 13H).

FIG. 14A to FIG. 14K: Estimating skin patch parameters using the cascaded MLP network on Antera data. Parameters obtained by adapting and augmenting Antera's maps (FIG 14D to FIG. 14G) and from albedo only input (FIG. 14H to FIG. 14K). As with the look-up based search, reconstruction with the latter approach is a slightly closer match to the input albedo.

FIG. 15A to FIG. 15F: Comparison of reconstruction with D65' vs W57 for broadband measurement. Top-row: Reconstructions (FIG. 15A and FIG. 15C) under D65' illumination compared to photograph (FIG. 15B). Bottom-row: Reconstructions (FIG. 15D and FIG.15F) under W57 illumination compared to photograph (FIG. 15E). Left column: Reconstructions (FIG. 15A and FIG. 15D) with maps estimated with our preferred D65' for broadband illumination. Right column: Reconstructions (FIG. 15C and FIG. 15F) with maps estimated with W57 (cool white LED) for broadband illumination.

FIG. 16A to FIG. 16D: Examples of physiologically based edits to Antera's adapted 4D parameters (FIG. 16A) producing realistic tanning (FIG. 16B), drained (FIG. 16C), and flushed (FIG. 16D) appearance.

FIG. 17A to FIG. 17H: D65' and synthesized blue facial textures (FIG. 17A, FIG. 17B), and the estimated chromophore maps (FIG. 17C, FIG. 17D, FIG. 17E, FIG. 17F) mapped onto UV texture-space of a face scan. Reconstructed facial geometry (FIG. 17G), and diffuse-only rendering with heterogeneous subsurface scattering (FIG. 17H).

FIG. 18A to FIG. 18F: Comparison of photographs of subject lit with cross-polarized point light source with 6 different LED spectras (top-row), against renderings driven by spectral parameters estimated using two complementary measurements (bottom-row).

FIG. 19A to FIG. 19D: Quality of D65 metamers created by various combinations of LEDs on the LED sphere. (FIG. 19A) Ideal metamer created when combining all 6 LEDs. (FIG. 19B) Employing only cool white LED (W57) in combination with the RGB LEDs also achieves a decent quality metamer. The quality drops off when combining RGB LEDs with one of the warmer white LEDs (FIG. 19C, FIG. 19D).

FIG. 22: Spectra of W57 and W57+blue illumination, jointly used to isolate the blue response.

FIG. 23A to FIG. 23F: Proposed practical spectral measurements of skin reflectance (FIG. 23A, FIG. 23B). (FIG. 23A) Broadband W 57 illumination. (FIG. 23B) Mix of W57+blue LED illumination. (FIG. 23C) Synthesized response to pure blue LED illumination, and its isolated blue channel data (FIG. 23F) employed for parameter estimation. (FIG. 23D) Direct measurement of skin response to blue illumination, and its isolated blue channel data (FIG. 23E).

FIG. 24A to FIG. 24C: Skin reflectance spectrum (from [DJ06]) and its response under: (FIG. 24A) Flat illumination spectrum. (FIG. 24B) D50 spectrum (employed by [JSB*10]). (FIG. 24C) D65 spectrum.

FIG. 25A to FIG. 25D: Estimated spectral parameters for a palm. Top-row: Using just broad band W57 LED illumination. Center-row: Estimation using D65 metamer (D65') broadband illumination. Bottom-row: Joint-estimation using D65' broadband+narrow band blue LED illumination.

FIG. 28A to FIG. 28C: Additional examples of skin patch measurements with Antera. Center-left: Initial 2D mapping of Antera's parameters. Center-right: Adapting and augmenting Antera's parameters for the skin model. Right: Parameter estimation using full 4D search.

FIG. 29A to FIG. 29C: Photographs of a female subject acquired under normal (FIG. 29A), and flushed (FIG. 29B) skin conditions. Reconstruction of simulated flushing (FIG. 29C) using spectral parameters estimated under nor-mal condition and applying scaling to the $C_h$ and $C_{he}$ parameters.

FIG. 30A to FIG. 30F: Renderings of acquired faces (top and center row) and a patch of skin (bottom-row) under a point light source with six different LED spectrums (W57, W40, W27, Red, Green and Blue).

FIG. 31A to FIG. 31C: Comparison of our proposed renderings of subsurface scattering with spectral parameters estimated using two complementary measurements (FIG. 31A), against photographs of two different subjects lit with a cross-polarized point light source (W40 LED) (FIG. 31B).

(FIG. 31C) Comparison renderings with spectral parameters estimated using a single broadband measurement under D65'.

FIG. 32A to FIG. 32B: Failure cases for our proposed 4D model and measurement approach. Top-row: Veins in the inner forearm. Bottom-row: Tattoo on the back of neck.

DETAILED DESCRIPTION

Figures 2A, 2B, 2C, 2D:
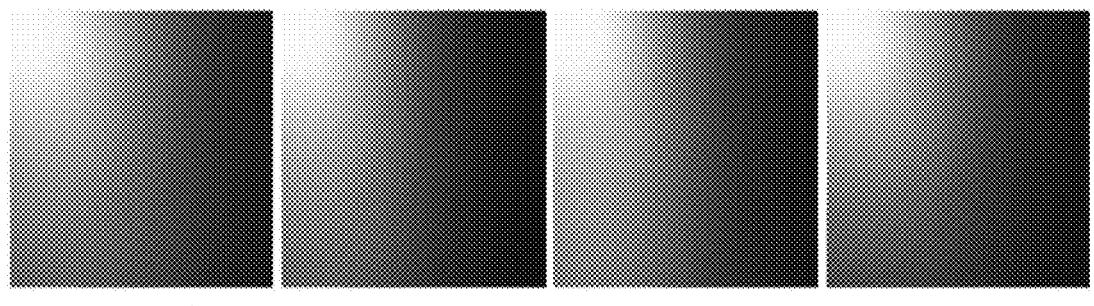
FIG. 2A to 2D: Spectral skin reflectance model variation due to $\beta_m$ (FIG. 2A, FIG. 2B), and $C_{he}$ (FIG. 2C, FIG. 2D) parameters, respectively. Individual 2D LUTs represent variation due to the dominant parameters $C_m$ (x-axis) and $C_h$ (y-axis).

In this work, we propose a novel practical spectral skin measurement approach (using an LED sphere) that, in conjunction with driving the spectral skin BSSRDF of [JSB*10] with appropriate model complexity, is suitable for facial capture of live subjects with realistic spectral appearance reproduction (Section 4). The acronym BSSRDF stands for Bidirectional Scattering Surface Reflectance Distribution Function We demonstrate that the proposed model complexity involving four parameters (melanin $C_m$ and hemoglobin $C_h$ concentration, melanin blend-type fraction $\beta_m$, and epidermal hemoglobin $C_{he}$ fraction) is required to match subject appearance in photographs, which may not be possible using a reduced model with just two free parameters (melanin and hemoglobin), and our proposed measurement protocol combining two complementary broad and narrow-band spectral illumination conditions provides higher quality estimates of spectral parameters than those obtained using just broadband illumination. Additionally, we demonstrate how to acquire ideal broadband and narrow-band illumination measurements for parameter estimation within the practical constraints of LED illuminants and regular color cameras. Thus, as our primary contribution, we propose a minimal measurement and modeling complexity for data-driven reproduction of spatially varying spectral appearance of skin, including human faces.

We also demonstrate how practical measurements with a hand-held off-the-shelf skin measurement device designed for dermatological applications (a Miravex Antera3D camera) can be adapted for realistic skin appearance reproduction and rendering (Section 5). Here, we demonstrate how to appropriately transform the output pigmentation and redness maps produced by the device into melanin and hemoglobin concentrations respectively, and augment them with additional model parameters ($\beta_m$ and $C_{he}$) which are not provided by the device. Additionally, we demonstrate how neural networks can be employed for faster, improved parameter estimation given our measurements (Section 6). Finally, we demonstrate realistic rendering of subsurface scattering with our estimated parameters (in PBRT) using spatially-varying diffusion profiles (Section 7), achieving renderings of human faces using a biophysically based spectral BSSRDF that are, for the first time, comparable to photographs (see FIG. 1A to FIG. 1C).

To summarize, our central high-level contributions in this work are as follows:
  Practical measurement of spectral skin reflectance suitable for facial capture in conjunction with appropriate model complexity of spectral BSSRDF for matching skin appearance in photographs. Adaption and augmentation of chromophore maps obtained from a hand-held dermatological skin measurement device for realistic rendering.
  Novel estimation of parameters from our measurements using neural networks, which is significantly faster than a look-up table search along with reduced quantization.

We additionally propose the following practical contributions for spectral measurements with a color camera:

- An optimization procedure for combining a set of broad- and narrow-band LED illuminants to construct a metamer for desired D65 illumination.
- Novel indirect measurement of narrow-band LED response that enables higher quality measurement with sharper spectral isolation than direct measurement with a color camera.
- A genetic programming algorithm for estimation of unknown illumination spectra from a single color chart observation.

3. SPECTRAL BSSRDF MODEL COMPLEXITY

We aim to drive a spectral skin BSSRDF model with practical measurements and hence prefer a model with an appropriately minimal complexity to simplify measurements while simultaneously having sufficient complexity to match the observed spatial variation in skin, particularly facial appearance. In this respect, we aim for a data-driven modeling of skin and facial appearance rather than striving for strict bio-physical accuracy of the estimated parameters. We choose the model of Jimenez et al. [JSB*10], originally proposed for facial measurements, as the starting point for our work. The model includes the following four parameters: melanin concentration ($C_m$) in epidermis, melanin blend-type fraction $\beta_m$ (blend between eumelanin and pheumelanin), and hemoglobin concentration ($C_h$) in dermis, and epidermis ($C_{he}$), respectively (please see Supplemental material for details). However, unlike Jimenez et al., we have empirically found that all four parameters in the model need to be varied over the skin surface in order to closely match the appearance of real skin. Variation in $\beta_m$ is particularly useful for reconstructing facial appearance variation due to facial hair and around eyelids, while a higher fraction of epidermal hemoglobin $C_{he}$ is necessary to match the very reddish areas of a face such as the lips and cheeks. Hence, we allow $\beta_m$ to vary between 0.0 and 1.0, and $C_{he}$ to vary between 0.0 and 0.6. We also set epidermal thickness d to 0.33 mm instead of 0.25 mm suggested in previous work in order to better match the appearance of subjects with the above spectral model.

This leads to a 4D spectral skin appearance model. In practice, in order to restrict the search space of the various parameters for model-fitting, we employ very coarse discretization for $\beta_m$ (10 bins) and $C_{he}$ (4 bins) parameters which have a more subtle effect on the overall appearance, while employing a large number of bins to model the dominant variation in $C_m$ and $C_h$. FIG. 2A to FIG. 2D shows the variation due to the two dominant parameters as a 2D LUT, while showing more subtle variation due to the $\beta_m$ parameter across (FIG. 2A, FIG. 2B) (for fixed $C_{he}$=0.25), and variation due to the $C_{he}$ fraction parameter across (FIG. 2C, FIG. 2D) (for fixed $\beta_m$=0.5).

Figures 3A, 3B, 3C:
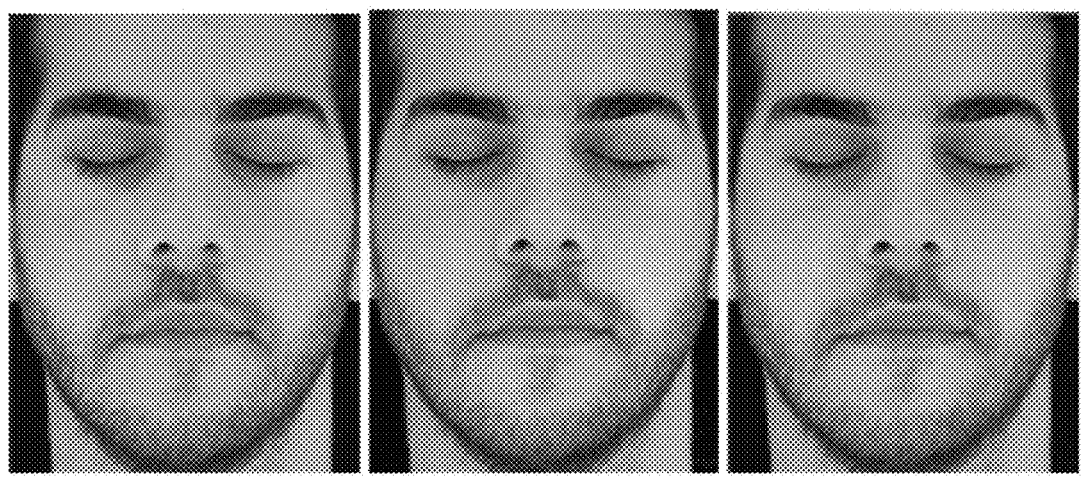
FIG. 3A to FIG. 3C: Comparison of a facial photograph under uniform broad-band (W57 cool white LED) illumination (FIG. 3B) to reconstructions using the reduced 2D spectral model of Jimenez et al. [JSB*10] (FIG. 3A), and using the complete 4D model (FIG. 3C) which enables a much closer match to the photograph.

FIG. 3A to FIG. 3C shows comparison of a facial photograph under uniform broadband illumination, and its reconstruction using the reduced 2D model employed by Jimenez et al. [JSB*10] with only two free parameters ($C_m$ and $C_h$) (FIG. 3A), and reconstruction using the complete 4D model with two additional free parameter ($\beta_m$, and $C_{he}$) (FIG. 3C). As can be seen, the 4D model complexity allows a closer match to the spatially varying appearance of skin in the photograph. We provide additional comparisons in the Supplemental material.

4. PRACTICAL SPECTRAL ACQUISITION FOR FACES

We now present our practical measurement protocol for robustly estimating the four parameters of the BSSRDF model with a minimal set of measurements suitable for facial capture. We employ a multispectral LED sphere equipped with a combination of narrow band Red, Green, and Blue LEDs, and three types of broad band LEDs (warm 2700K, neutral 4000K, and cool 5700K which we refer to as W27, W40, and W57 respectively), and 9 color DSLR cameras (Canon 800D) for multiview acquisition of a subject. The LEDs on the sphere are all cross-polarized w.r.t. the cameras, allowing specular cancellation according to the method of [GFT*11]. We also measured the individual spectral distributions of our illuminants using a spectrometer (Sekonic SpectroMaster C700) placed at the center of the LED sphere (see FIG. 4A). With this setup, we simultaneously record the diffuse reflectance response of a subject from multiple viewpoints under specific uniform spectral illumination conditions as described next.

4.1. Measurement Protocol

With this setup, when we restricted ourselves to a single observation (as a baseline), we found the best individual LED illumination on our LED sphere for estimating model parameters to be uniform W57 (cool white LED) illumination (see FIG. 3B). Here, W57 illumination provided the highest color contrast in the skin reflectance for parameter estimation using CIELAB space color matching given a pre-computed 4D look-up table for the skin model under W57 illumination (more details in Supplemental material). Our choice of W57 broadband illumination is also supported by the study of Preece & Claridge [PC04] who found a peak around 560 nm to be useful for measurement of hemoglobin concentration, and a peak around 485 nm to be useful for measurement of melanin. Consistent with this study, we found improved parameter estimation when using two complementary spectral illumination conditions: a combination of broad band+narrow band blue LED illumination (480 nm peak response). The premise here is that the blue illumination primarily only excites epidermal reflectance [PC04], while broadband illumination excites both epidermal and dermal reflectance. The response to narrow-band blue illumination exhibits sharper skin texture (melanin response) due to reduced scattering of the wavelength compared to broadband illumination. This enables us to estimate sharper descattered parameter maps when jointly employing the two complementary illumination conditions for LUT search. Furthermore, instead of making direct measurements under W57 and blue LED illumination respectively, we instead employ the following procedure:

Ideal broadband measurement: Given the 6 types of LEDs in our LED sphere, we instead create a more ideal broadband illumination by computing a weighted combination of all 6 LEDs to create a D65 metamer spectra (D65') which we instead employ for our broadband measurements. We notice an even higher contrast in skin color, particularly coloration due to skin pigmentation and redness, under the D65 metamer illumination and we make the observation that D65 spectrum (blue dominant) balances the somewhat skewed red-dominant reflectance spectrum of human skin (see Supplemental material). This is consistent with studies on the human visual system [CXW19] where D65 spectrum has been reported to be most desirable for discerning differences in skin color. Note that true D65 illumination is not possible with the LEDs on our LED sphere. Instead, the D65 metamer is created to be an approximation of the ideal D65 spectra achieved by the available LEDs such that it minimizes the color difference between the 24 color patches measured on an Xrite color chart vs the reference 24 colors on an ideal color chart in sRGB color space (which assumes ideal D65 spectrum). Our computed metamer spectrum can be seen in comparison to the ideal D65 spectrum in FIG. 4B. We provide more details on how to compute the D65 metamer in Appendix A.

Narrow-band measurement: Directly recording the reflectance response of a subject under blue LED illumination unfortunately results in some colors being outside the gamut of most off-the-shelf color cameras, which typically work in the sRGB and Adobe RGB colour spaces, with the chromaticity of the narrow band being noticeably outside both colour spaces (FIG. 6A). This results in suboptimal narrow-band measurements. Instead, we propose a novel procedure to overcome this gamut limitation of regular color cameras by instead recording a mix of broadband and blue LED illumination during measurement, and given another measurement under uniform broadband illumination, we can then computationally isolate the narrow band response to just blue LED illumination afterwards as described next.

4.2. Isolation of Blue Response

We propose an indirect scheme in order to measure skin response under blue LED illumination. We capture two photographs of a subject, the first one under broadband lighting ($I_W$) and the second one under broadband plus blue LED ($I_{W+nb}$). We then separately apply to both the images a Chromatic Adaptation Transform (CAT) (defined in Appendix B), to predict colours appearance under D65 lighting and within the sRGB gamut, and computationally recover the desired narrow band response $I_{nb}$ as follows:

$$I_{nb} = \delta \times (\mathrm{CAT}(I_{W+nb}) - \mathrm{CAT}(I_W)/\delta), \quad (1)$$

where the factor δ accounts for the difference in intensities of the LEDs in the two conditions.

In our case, we preferably employ D65 metamer illumination for the broadband measurement ($I_W = I_{D65'}$) which greatly simplifies its CAT transform to identity matrix. However, the transform is general and can be employed with any broadband illumination (e.g., W=W57 cool white LED) for computing the spectral isolation as per Equation 1. The above scheme offers an additional advantage of actually measuring the skin response under a slightly narrower band than the one offered directly by blue LED (FIG. 6B), further contributing to sharper details in the measurement.

The capture process can be visually seen in FIG. 5A to FIG. 5F where the response of a subject's face to our proposed two complementary uniform spectral illumination conditions (FIG. 5A, FIG. 5B) are shown in the top row. Afterwards, we can computationally synthesize the response to pure blue illumination as shown in (FIG. 5C). Note that only the blue channel of this synthesized image is relevant for our analysis, while the red and green channels of (FIG. 5C) are residuals of CAT transform after white-balancing, which is why they are ignored. The isolated blue measurement from the synthesized image can be seen in grayscale in (FIG. 5F) showing skin texture and blemishes in sharp detail which is very correlated with skin melanin concentration. FIG. 5D instead shows the subject's direct response to pure blue LED illumination as recorded by the color camera, where some spatial details of the skin texture are lost in the isolated blue component FIG. 5E of image FIG. 5D. We include similar example images for a subject acquired using W57 LED for the broadband condition in the Supplemental material. Note that our preferred choice of broadband illumination (D65') and indirect measurement of the narrow-band illumination also has a practical advantage of employing all types of LED illuminants in our measurement setup, thereby creating much brighter lighting conditions for faster higher quality measurements compared to when employing a single type of LED.

4.3. Results

With the measurement protocol described in Section 4.1, we do a joint look-up table search for best matching color values (in CIELAB space) under simulated D65 metamer illumination (FIG. 5A), and best matching synthesized blue channel response under simulated blue LED illumination (FIG. 5F). FIG. 7A to FIG. 7H (top-row) presents the various parameter maps ($C_m$, $\beta_m$, $C_h$, $C_{he}$) estimated for a subject's face using the above acquisition and fitting procedure. Here, we are visualizing the total $C_{he}$ fraction and not as a fraction of $C_h$. FIG. 7A to FIG. 7H (bottom-row) presents comparisons of photographs of the subject and our reconstruction with the estimated parameters under D65 metamer illumination and a warmer spectral illumination condition (W27) which was not employed in parameter estimation. A similar comparison under W57 illumination can be seen in FIG. 3A to FIG. 3C.

FIG. 8A to 8H presents the estimated parameter maps using our pro-posed two complementary spectral measurements, and comparison of spectral reconstructions to photographs for two subjects with different skin types. These include a male subject with Asian skin type, and a Caucasian female subject with a pale skin type whose measurements we acquired using the D65 metamer (D65') as the broadband illumination. As can be seen, the reconstructions are a close match to the photographs under different types of illumination spectrum. The estimated parameters maps not only well reconstruct the appearance of skin well under cooler illumination spectrum, they also appropriately predict the softening and blurring of the skin texture seen under the warmer W27 illumination. The Supplemental material includes an additional example of a Caucasian male subject whose measurement was acquired using the cool white LED (W57) as the broadband illumination, as well as results for a palm of a hand. We provide additional analysis in Section 7.

5. PRACTICAL SKIN MEASUREMENTS WITH ANTERA3D

The focus of the previous section was on practical spectral measurements of skin in a controlled setup suitable for facial capture. For more free-form measurement of skin, we employ a hand-held off-the-shelf device—Antera 3D© (Miravex Limited, Ireland), a camera for image acquisition and corresponding software for analysis of single skin patches (56×56 mm$^2$). This is an instrument employed in dermatology: it has been compared with most commonly used devices in dermatological research and is reported to be robust, sensitive and precise for skin colour analysis [MFCN15, LWA*18]. For a single measurement, the camera is placed onto a skin patch without applying excessive pressure. The typical measurement procedure along with sample results for a cheek patch is shown in FIG. 9A to FIG. 9E. Any area of the human body can be captured in less than 2 seconds at a resolution of 0.1 mm. The acquisition procedure with the device is as follows: The device consists of a camera and various LEDs covering seven different spectral bands (narrow- and broad band) in a single self-contained unit. During acquisition, the device illuminates the skin patch sequentially with its spectral LEDs from different angles. The obtained reflectance data are transformed by the vendor's proprietary software into skin absorption coefficients and used to quantify chromophore concentrations using mathematical correlation with known spectral absorption data of hemoglobin and melanin. The software provides spatially varying maps of these two chromophore concentrations as well as corresponding 3D surface geometry of the skin patch which is estimated using photometric stereo. The device also provides a color (albedo) map of the skin surface estimated using the acquisition process.

This is a good starting point for employing the data for spectral rendering of skin. However, the device does not capture all of the parameters we have identified as necessary for reproduction of skin appearance. Importantly, for the two parameters that are provided, the device provides chromophore concentrations in terms redness and pigmentation which do not directly map as $C_m$ and $C_h$ for the BSSRDF model. Hence, we have to undertake a number of steps in order to adapt the Antera measurements for driving the skin appearance model.

5.1. Parameter Remapping and Estimation

Given that Antera estimates only the two primary parameters (pig-mentation and redness) related to melanin and hemoglobin concentration, in a first step we adapt these maps based on Jiminez et al.'s reduced 2D model of skin appearance. In order to do this, we employ the albedo map provided by Antera and estimate corresponding $C_m$ and $C_h$ for the Jimenez model using the same look-up table search procedure (in CIELAB space) described in the previous section. Given our best fit to the 2D model, we then scale antera's maps for pigmentation and redness in an appropriate manner to match the mean and variance of our estimated $C_m$ and $C_h$ parameters (using color space matching), and set these scaled pigmentation and redness maps as our final estimate of $C_m$ and $C_h$ for reconstruction. FIG. 10B shows reconstruction for the measured cheek patch using this 2D remapping procedure using the reduced Jimenez model.

Note that this above remapping step requires us to simulate a 2D lookup table (fixed $\beta_m$ and $C_{he}$) under the same illumination spectra employed for measuring Antera's albedo map. However, this information of the illumination spectrum for the Antera albedo is not provided by the device or the vendor and, being a proprietary device, we have no control over its LED illumination system in order to make a direct measurement of the appropriate LEDs: the device cycles through all the LEDs very rapidly, making direct measurement of spectrum (e.g., with a spectrometer) difficult. Hence, we estimate the unknown illumination spectrum for the albedo measurement using corresponding measurements of color squares on an Xrite color chart and then solve for the illumination spectrum (see FIG. 11A) using a genetic algorithm based optimization detailed in Appendix C. We note that the recovered spectrum for Antera's albedo seems to be an approximation of D65 illumination obtained with the LED illuminants on the device. In this respect, it is conceptually very similar to the D65 metamer illumination we create using the LEDs on our LED sphere. Given that we lack the ground truth for Antera's illumination profile, we indirectly validated the spectrum estimation process using a color chart observation under D65 metamer illumination using the LED sphere (see FIG. 11B).

After recovering the illumination spectrum for Antera's albedo, we can remap Antera's chromophore maps to the appropriate scale using a 2D look-up table based on the reduced Jimenez model. We then fix the $C_m$ and $C_h$ parameters and then re-fit the albedo data to the complete 4D model, this time searching for appropriate values of $\beta_m$ and $C_h$e parameters in a 4D look-up table for fixed values of $C_m$ and $C_h$. FIG. 10C shows reconstruction for the measured cheek patch using this procedure which augments Antera's maps with the two additional parameters required by the 4D model. As can be seen, the reconstruction result of this remapping and augmentation step is a closer match to the albedo map than just remapping the data to the 2D model. We also experimented with directly estimating all four parameters for the model using the albedo map which results in an even closer match for the reconstruction to the measured albedo map (see FIG. 10D). However, the parameter maps estimated using just the albedo map are more noisy and show less physiologically correlated structure than the parameters obtained by remapping and augmenting Antera's maps. This is consistent with our findings in the previous section on practical skin measurements with two complementary spectral illumination conditions. Thus, we believe that parameter maps directly estimated using only the albedo data may be somewhat overfitting to the input data (hence lower reconstruction error) and suffer from some baked-in subsurface scattering visible in the albedo, while the maps estimated by adapting and augmenting Antera's measurements seem to have a higher physiological correlation and hence likely to better generalize to other spectral conditions or for predicting changes in physiological state of skin. We provide additional results for acquired skin patches in Section 7 and Supplemental material.

6. NEURAL PARAMETER ESTIMATION

Thus far, we described how to estimate the spectral parameters of skin from our measurements using a look-up table search (for best matching color values in CIELAB space). This process is slow and the results can be prone to image noise and quantization due to discrete values in the look-up table. Hence, instead we also explored a neural prediction approach for obtaining the spectral parameters from our measurements using a cascaded feed-forward multilayer perceptron (MLP) architecture (see FIG. 12). We note some conceptual similarity in our approach with that of [YSJR17] who employed MLPs for parameter conversion from one rendering model to another (volumetric scattering to dipole diffusion) for global scattering in hair/fur fibers.

Figure 12:
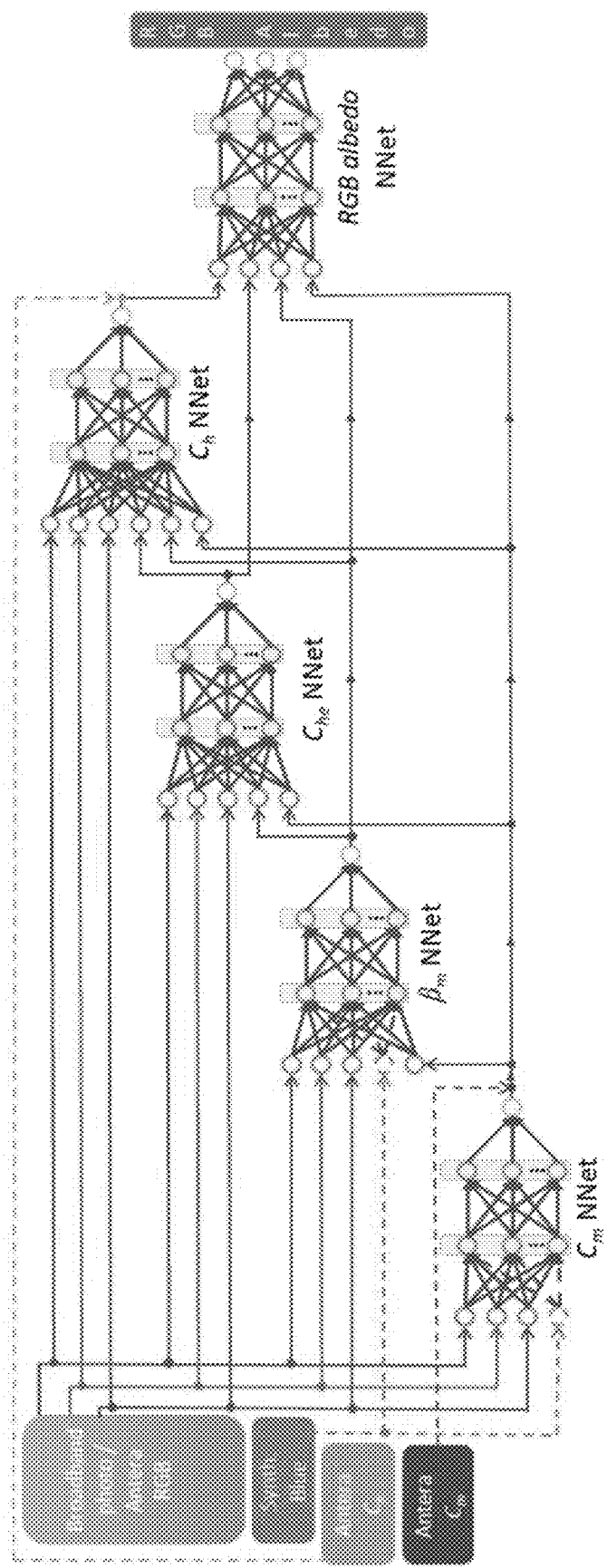
FIG. 12: Pipeline for neural parameter estimation and reconstruction from our measurements.

Each of the 4 parameters of our model is estimated by a different MLP (see FIG. 12. From left to right $C_m$NNET, $\beta_m$NNET, $C_{he}$NNET and $C_h$NNET), which all share the input from an RGB image, either from our acquisition setup under broadband illumination (D65' or W57) or the albedo map from Antera. In the cascaded order, $C_m$NNET estimates $C_m$ from the RGB input, and provides the prediction in input to all the subsequent MLPs; similarly, $\beta_m$NNET provides its output to $C_{he}$NNET and $C_h$NNET, and so on. The last MLP in the cascade sequence, RGBAlbedoNNET, takes in input the estimated $C_m$, $\beta_m$, $C_{he}$ and $C_h$ to predict the RGB albedo, ideally matching the input photograph.

To achieve higher accuracy, when the RGB input photograph is provided by our LED sphere setup, $C_m$NNET and $\beta_m$NNET can also take in input the synthesized response to pure blue LED illumination. Additionally, if the RGB input is provided by Antera, its remapped $C_m$ and $C_h$ measurements can be used to bypass respectively $C_m$NNET and $C_h$NNET.

6.1. Design and Training of the MLPs

The first layer of each MLP is the input layer, followed by two hidden layers (L1 and L2) and the output layer. It is well know that two-hidden-layer feedforward networks can approximate complex nonlinear mappings with arbitrary accuracy given enough nodes in the hidden layers and training data. In our pipeline, we train the MLPs on synthetic RGB data, i.e the 4D LUTs provided by the spectral skin reflectance model, augmented by zero-mean white Gaussian noise to simulate photon shot noise. The noise variance is directly estimated from homogeneous areas in a photograph of a color chart. We then analyze the effect of the noise on the estimated parameters in order to derive a suitable noise model to inject in the skin model parameters used to train the MLPs.

To determine the number of nodes $N_{L_1}$ and $N_{L_2}$ to use in each hidden layer, we observe that the upper bound of the number of nodes per layer can be computed through the following equations [Gua03], where m is the number of output nodes (m=1 for $C_m$NNET, $\beta_m$NNET, $C_{he}$NNET and $C_h$NNET, while m=3 for RGBAlbedoNNET) and N is the number of distinct training samples (i.e. the size of the LUTs):

$$U_{N_{L_1}} = \sqrt{(m+2)N} + 2\sqrt{\frac{N}{m+2}} \quad (2)$$

$$U_{N_{L_2}} = m \cdot \sqrt{\frac{N}{m+2}}. \quad (3)$$

Since such upper bounds might overfit the input data [Gua03], to avoid overfitting and to increase the generalization capabilities of our MLPs we set $N_{L_1}=U_{N_{L_1}}/k$ and $N_{L_2}=U_{N_{L_2}}/k$, with k≈100, and train the networks using Bayesian regularization backpropagation [Mac92]. Finally, we use a hyperbolic tangent function as activation function.

We train the parameter networks $C_m$NNET, $\beta_m$NNET, $C_{he}$NNET and $C_h$NNET once for each input type (e.g., broadband-only or broadband+synth. blue) with D65' as the broadband spectrum for LED sphere data, and the recovered Antera spectrum as the broadband for Antera data. However, the RGBAlbedoNNET used for albedo reconstructions from the input parameters is specific for a given illumination spectrum, and needs to be trained separately for different target illumination spectras.

6.2. Results

FIG. 13A to FIG. 13H presents spectral parameter maps and albedo reconstructions under two uniform spectral illumination conditions, achieved with the above described cascaded MLP network for the subject shown earlier in FIG. 7A to FIG. 7H. As can be seen, both the estimated parameters and the RGB albedo reconstructions are very comparable to that achieved using look-up table search, with the added advantage of reduced noise and quantization, as well as significantly faster parameter estimation and reflectance reconstruction (3.5 seconds for MLP network vs 40 minutes with LUT search, i.e., >680× speedup for 2K resolution on a laptop with 2.7 GHz Intel Core i7 processor and 16 GB RAM).

FIG. 14A to FIG. 14K demonstrates the cascaded MLP network on the input provided by Antera on the cheek patch shown earlier in FIG. 10A to FIG. 10L, either using its $C_m$ and $C_h$ remapped measurements to bypass $C_m$NNET and $C_h$NNET, thus only estimating $\beta_m$, $C_{he}$ and albedo (FIG. 14A to FIG. 14K, second row), or directly estimating all four parameters of the model using the albedo map (FIG. 14A to FIG. 14K, third row). As can be seen, the parameters estimated with the MLP network are qualitatively very similar to those obtained with look-up table search shown in FIG. 10A to FIG. 10L, with the advantage of much faster estimation. Similar to the look-up table search, estimating the parameters directly from the Antera photograph results in a slightly closer match of the reconstruction to the input albedo map compared to when employing the Antera adapted $C_m$ and $C_h$ parameters.

7. ADDITIONAL RESULTS AND RENDERING

We now present additional set of results with our proposed practical spectral measurements for faces, and skin-patch measurements with the Antera3D device. FIG. 15A to FIG. 15F compares the quality of spectral reconstructions with parameters maps estimated when employing our preferred D65 metamer for the broadband measurement (left-column) vs parameter maps estimated when employing the baseline W57 cool white LED illumination for the broadband measurements (right-column). As can be seen, measurements of the spectral parameters using D65' illumination is able to well predict the appearance under W57. However, when the parameters are estimated using W57 illumination, the predicted appearance under D65' is slightly less accurate, resulting in more saturated colors. This supports our preference for the D65' illumination as the broadband condition for our skin measurements. However, as also shown in FIG. 8A to FIG. 8H, our approach still enables parameter estimation of sufficient quality even when employing just two types of LEDs (W57 and blue) for the broadband and narrow-band measurements.

FIG. 16A to FIG. 16D presents examples of physiologically based edits performed on Antera data (a forehead patch). Here, we employ the parameters maps obtained after adapting and augmenting the Antera data to show the original reconstruction of skin appearance (FIG. 16A), followed by simulated tanning (FIG. 16B) by scaling up the $C_m$ parameter by 1.1 in addition to an offset of 0.08 units in cubic root space. Similarly we simulate pale drained appearance in (FIG. 16C) by scaling down the original $C_h$ parameter by 1.5 in cubic root space. Finally, flushed skin is simulated in (FIG. 16D) by scaling up the original $C_h$ parameter by 1.1. As can be seen, such simple edits to the adapted Antera maps achieve very realistic physiological changes in skin appearance. We provide a similar example of physiologically based edit for a face in the Supplemental material.

We note that parameters estimated using a single broadband measurement of the albedo encodes some amount of subsurface scattering in the parameter maps due to subsurface scattering being baked in the albedo (also observed by Jimenez et al. [JSB*10]). Since our look-up table based reconstruction of the albedo does not do explicit simulations of subsurface scattering, we actually found closer matches (in CIELAB space) to the input photographs when reconstructing the albedo using parameters estimated under a single broadband condition compared to our proposed approach of combining the broadband measurement with narrow-band blue response (also true for Antera data where full 4D search results in better match to input photograph). The reconstructions with our proposed measurements are slightly sharper, with less baked-in subsurface scattering compared to the input photograph which we attribute to the sharp descattered measurement of the narrow-band response. This is actually a desirable outcome for rendering of subsurface scattering with the measured parameter maps. Jimenez et al. employed their measured maps to only reconstruct the albedo which they employed as a modulation texture to a homogeneous subsurface rendering with a fixed diffusion profile. In contrast, our estimated maps allow us to render subsurface scattering with spatially varying albedo and diffusion profiles as explained next.

7.1. Rendering Subsurface Scattering

Inspired by the work of Donner et al. [DWd*08], we employ our estimated parameters to render heterogeneous subsurface scattering in skin. We employed PBRT v2

[PH10] to generate renderings with pseudo-heterogeneous subsurface scattering driven by our estimated spatially varying parameters of the spectral BSSRDF model. Given a facial scan of a subject obtained with multiview acquisition in the LED sphere (we employ COLMAP [SF16, SZPF16] for the base geometry reconstruction), we first project the input data of broadband D65' response (which is also the input to COLMAP for geometry reconstruction) and synthesized narrow-band blue response into the UV texture-space of the face scan (see FIG. 17A, FIG. 17B). We then compute the four spectral parameters of the skin BSSRDF in this UV texture-space and project it onto the base geometry within PBRT for rendering with the skin coloration model.

In order to render heterogeneous subsurface scattering, we modified the provided subsurface scattering implementation in PBRT from the default dipole diffusion kernel to our specified spatially varying profiles implementing two-layered diffusion. For each sampled color generated by the skin model under chosen illumination spectrum, we first pre-compute corresponding spectral reflectance and transmittance profiles for epidermis and dermis separately. We use a dipole model for dermis and a multipole model for epidermis as suggested by [DJ06]. We then convolve these spectral profiles according to Kubelka-Munk formula [DJ05] and store the overall radial reflectance profile function in linear RGB color space. At each point on the surface, PBRT framework extracts the corresponding precomputed spectral reflectance profile from the tabulated set and integrates it over a given radial distance and performs the same operation for all other sampled points on the geometry to add contribution from different spectral profiles, thereby rendering heterogeneous subsurface scattering (more details in Supplemental material). While we convert the spectral profile contributions after integration to RGB within PBRT, it is possible to pre-compute the profiles in sRGB space for usage in a standard RGB rendering pipeline.

FIG. 17H shows such a diffuse-only rendering of spatially-varying subsurface scattering for a male subject lit with a point light source (D65' spectrum). FIG. 1A to FIG. 1C (top-row) presents renderings with additional specular reflectance for the same subject, as well as an additional subject, and a skin patch measured using the Antera camera. Here, we render the specular reflectance as a separate layer in PBRT using a microfacet BRDF with Blinn-Phong distribution, and add it to the diffuse-only rendering as a post-process. We provide additional diffuse-only renderings of the subjects under the illumination spectras of the six types of LEDs in our LED sphere (FIG. 1A to FIG. 1C (bottom-row), also see Supplemental material).

FIG. 18A to FIG. 18F presents comparisons of renderings of Subject 1 to photographs under each of the six types of LEDs on the LED sphere. Here, the subject was acquired on a different day compared to the data used for FIG. 1A, with noticeable difference in facial hair. As can be seen, renderings with the estimated parameters correctly predict the change in appearance across the six spectrums, with characteristic softening of skin texture under the warmer spectrums. We additionally provide qualitative comparisons (against photographs) of renderings with parameters estimated using our proposed two complementary measurements vs using a single broadband measurement for parameter estimation (which results in softer, blurry skin appearance) in the Supplemental material.

Note that the facial geometry and spectral measurements for the face renderings were acquired using a multiview capture setup (9 DSLR cameras) placed around the LED sphere. For rendering subsurface scattering in PBRT v2, we had to significantly downsample the mesh vertices, thereby rendering a smooth base mesh seen in FIG. 17A to FIG. 17H. For rendering the specular layer in FIG. 1A to FIG. 1C, we compute shading based on a photometric normal map acquired using the LED sphere. The geometry for the back of the hand in FIG. 1A to FIG. 1C is provided by the Antera software which computes the shape of a relatively planar skin patch using photometric stereo which we directly employ for both the subsurface and specular rendering.

7.2. Limitations and Discussion

The employed 4D skin BSSRDF model is well suited to reconstruct the appearance of skin and facial hair but has limitations and cannot well reconstruct the appearance of dominant veins or tattoos in skin (see Supplemental material). This is because veins and tattoos cannot be modeled with melanin and hemoglobin concentrations [DWd*08]. We currently do not model any fluorescence in skin, although our broadband measurements likely include some effects of dermal fluorescence [GZAK00]. Through our analysis, we show that parameter estimation using just a single broadband illumination is possible, although suboptimal. The quality and structural physiological correlation of the estimated parameters increases with multiple measurements. In this respect, our proposed two shot acquisition with the complementary spectral illumination conditions is a practical middle ground between the highly accurate measurements possible with detailed spectral imaging as demonstrated by [DWd*08] (also employed by the Antera camera), and just single broadband illumination previously employed for practical measurements of faces. Our choice of illuminants is also a function of the LEDs available in our facial capture setup, and the optimal choices may vary slightly for other spectral illumination setups. However, we demonstrate through our analysis the general trend of the desired illumination conditions for skin measurements, and a method for approximating desirable D65 spectrum using combination of available LEDs. Note that an LED sphere is not a strict requirement for the measurements since the method only requires uniform illumination, and hence can be adapted for many facial capture setups. When employing the Antera camera, we are rather restricted to only using the processed outputs of its proprietary software which does not allow access to the raw data of the spectral measurements for further analysis. However, we demonstrate how to adapt black-box measurements from such a custom dermatological scanning device for realistic rendering.

For the LED sphere measurements, we currently estimate parameters assuming uniform illumination with no occlusions. However, for faces there is partial ambient occlusion around eye sockets and the nose that is baked into the measurements and by extension in our estimated parameter maps. We also do not currently explicitly account for the effect of exitant Frensel in these measurements which slightly affects the parameters estimated for surfaces seen at a grazing angle (most visible in the $\beta_m$ map).

This is not really a problem for our 3D renderings which employ data seen from 9 different viewpoints and hence the facial parameter maps in the UV parameterization of the geometry is composed of mostly near normal incidence estimates. Finally, our look-up table based reconstructions reproduce the coloration of albedo texture under uniform illumination, but do not model lateral scattering of light within skin which requires explicit rendering of subsurface scattering.

8. CONCLUSION

In summary, we have presented novel practical spectral measurements of skin reflectance using both a dedicated spectral illumination setup (LED sphere) and an off-the-shelf skin measurement device (Antera3D), and employed them to drive a spectral skin BSSRDF model with appropriate complexity to match the appearance of real skin. In this respect, our main contribution is proposing a sweet spot both for measurement and data-driven modeling complexity for reproducing the appearance of skin, including human faces. Our additional contributions include investigating desirable illumination spectra realizable with common LEDs, practical analysis of the gamut limitations of regular RGB color cameras for measuring response to narrow band LED illumination, and proposing a novel indirect measurement protocol that overcomes the gamut limitation and achieves improved spectral isolation compared to direct measurement with a color camera. We also demonstrate how to adapt practical hand-held physiological measurements from a dermatological skin measurement device to our application of realistic rendering which can have a significant impact for dermatological visualizations. Additionally, we also demonstrate how neural networks can be employed for much more efficient parameter estimation and spectral reconstructions given various types of measurements. We see this as a promising initial step towards efficient machine-learning based spectral skin rendering and diagnostics. We demonstrate highly realistic reconstructions of skin with our approach, including renderings of human faces using a biophysically based skin BSSRDF that are, for the first time, comparable to photographs. Future work in this direction could investigate practical measurements and modeling of changes in skin parameters due to skin dynamics or physiological factors of interest for medical diagnostics, as well as applications of any skin products.

Appendix A: D65 Metamer

We address the problem of reproducing a desired spectral illumination (D65) using the LEDs in our LED sphere relying on the faithful reproduction of the appearance of a color chart. We first acquire a set of images of the color chart with known reflectance, individually under each of the n=6 LEDs. The measurements are taken at 3 different LED intensities, under uniform spherical illumination. Given the knowledge of the camera spectral sensitivity CSS, measured with a monochromator, this data allows us to recover the per-channel (ch) non-linear response of the camera sensor $\gamma_{ch}$, and the LEDs relative intensities $\alpha_k$.

This is similar to the approach of LeGendre et al. [LYL*16], except that instead of focusing only on the color chart appearance to a given camera, we also aim at maximizing the faithfulness of perceived color appearance to a human observer. The reason for simultaneously accounting for a percetual metric besides camera sensitivity in our optimization is that the Chromatic Adaptation Transform (Appendix B)

$$w_c t_c + w_h t_h \quad (4)$$

$$t_c = \sum_{j=1}^{N_p} \sum_{ch=r,g,b} \left\| DG_{j,ch} - \left( \sum_{k=1}^{n} a'_k \sum_{\lambda=380}^{720} CSS_{ch,\lambda} S_{k,\lambda} R_{j,\lambda} \right)^{\gamma_{ch}} \right\| \quad (5)$$

$$t_h = \frac{1}{N_p} \sum_{j=1}^{N_p} \Delta E_{2k} \left( Lab_{D65,j}, XYZ \to Lab\left( \left[ X_{j,\alpha'_k}, Y_{j,\alpha'_k}, Z_{j,\alpha'_k} \right] \right) \right); \quad (6)$$

employed for spectral isolation of narrow-band response, and look-up table search for the spectral parameters are all based on perceptual metrics. In order to find a spectrum which satisfies the above, given the weights $w_c$ and $w_h$ for the camera and perceptual terms respectively, we need to find a set of coefficients $\alpha^*_k$, for the n=6 LEDs which minimizes the following equation:

where DLj, ch are the per-channel digital levels of the patch j of the color chart, $Lab_{D65,j}$ are the CIELab values of the color chart patches under D65 illumination, XYZ→Lab is a standard conversion using the D65 reference white [WS82], and $[X_{j,\alpha'_k}, Y_{j,\alpha'_k}, Z_{j,\alpha'_k}]$ are the XYZ tristimulus values of the color chart patches under the spectrum resulting from the coefficient $\alpha'_k$, computed using the $\hat{x}, \hat{y}, \hat{z}$ a CIE 2° colour matching functions. The coefficients $\alpha^*_k$ are found by means of a convex non-linear optimization, constraining the solution to have all non-negative values.

FIG. 19A shows the quality of the D65 metamer found by means of the above optimization, by comparing the color chart appearance under the ideal D65 spectrum (background of each square), and the appearance of the color chart under the metamer shown in the circles at the center of each square (mostly barely visible or invisible). Given that this solution for the D65 metamer requires our specific set of 6 LEDs which may not be common, we repeated the experiment by using the Red, Green, and Blue LEDs along with only one of the broadband white LEDs at a time since an RGBW lighting system might be more common. The results, reported in FIG. 19B, FIG. 19C, FIG. 19D, show that the overall color rendition quality of the system is somewhat reduced. However, a very reasonable approximation of the D65 can be still found by using the W57 cool white LED in combination with RGB LEDs which is consistent with the findings of [LYL*16].

Appendix B: Chromatic Adaptation Transform

The Chromatic Adaptation Transform (CAT) of an image CAT ($I_{III}$) is computed in the CIE XYZ tristimulus values space, where its predicted $[X^{D65} Y^{D65} Z^{D65}]^T$ values under D65 illumination are derived as follows:

$$\begin{bmatrix} X^{D65} \\ Y^{D65} \\ Z^{D65} \end{bmatrix} = M_{CAT} * \begin{bmatrix} \alpha^{D65}/\alpha^{III} & & \\ & \beta^{D65}/\beta^{III} & \\ & & \gamma^{D65}/\gamma^{III} \end{bmatrix} * M_{CAT} * \begin{bmatrix} X^{III} \\ Y^{III} \\ Z^{III} \end{bmatrix} \quad (7)$$

where $$\begin{bmatrix} \alpha^{D65} \\ \beta^{D65} \\ \gamma^{D65} \end{bmatrix} = M_{CAT} * \begin{bmatrix} X_w^{D65} \\ Y_w^{D65} \\ Z_w^{D65} \end{bmatrix} \quad (8)$$

and $$\begin{bmatrix} \alpha^{III} \\ \beta^{III} \\ \gamma^{III} \end{bmatrix} = M_{CAT} * \begin{bmatrix} X_w^{III} \\ Y_w^{III} \\ Z_w^{III} \end{bmatrix}. \quad (9)$$

In the above, $[X_w^{III} Y_w^{III} Z_w^{III}]^T$ and $[X_w^{D65} Y_w^{D65} Z_w^{D65}]^T$ respectively represent the tristimulus values of the source III and D65 illuminants. The 3×3 matrix $M_{CAT}$ models human color perception at the LMS cone response level [BS10b], and is derived by numerical optimization [BS10a]. Please note that, given the typical overlapping design of camera sensors spectral sensitivity, the red and green channels of $I_{nb}$ might contain non-zero signal, similarly to a direct acquisition of a photograph under narrow band illumination.

Appendix C: Estimating Antera's LED Spectrum

The lack of control over Antera's LEDs, both in terms of switching sequence and speed, makes it difficult to directly measure the lighting spectra using a spectrometer given the typical integration time of over 1 second per measurement. Moreover, the individual LEDs have different orientations, thus requiring an integrating sphere for accurate spectral measurements. Hence, we opted for spectral recovery by means of a Genetic Algorithm (GA) based optimization by providing as input to our algorithm a sequence of photographs of a standard reference colour chart, with Np=24 colour patches of known spectral reflectance R.

Our GA begins with a random guess for the Antera's LEDs spectra S: the optimization is driven by a fitness function $f$, which measures the differences between the acquired digital levels and the simulated ones according to a standard camera model:

$$f(S, CSS) = \sum_{n=1}^{N_p} \sum_{ch=r,g,b} \left\| DG_{n,ch} - \left( \sum_{\lambda=380}^{720} CSS_{ch,\lambda} \cdot S_\lambda \cdot R_{n,\lambda} \right)^{\gamma_{ch}} \right\|, \quad (10)$$

where $DG_{n,ch}$ is the acquired digital level of the ch channel of the colour patch n and $\gamma_{ch}$ models the per-channel non-linear response of the sensor.

The above equation implies the joint estimation of the incident spectra S and the Antera's spectral sensitivity CSS. Hence, a naïve implementation would be extremely underconstrained. However, the specifications of the Antera camera report that it can be used as a colorimeter, thus implying that the spectral sensitivity must fulfill Luther's condition (i.e. it is a linear transformation of the CIE 1931 2-degree Colour Matching Functions), greatly reducing the search space. Furthermore, we enforce the recovery of the LEDs spectra by augmenting $f(S, CSS)$ with a smoothness constraint:

$$f'(S, CSS) = f(S, CSS) \cdot \left( 1 + \left\| \frac{\sigma(\delta(S))}{\delta(S)} \right\| / k \right), \quad (11)$$

where K is a scale constant related to the desired resolution in nm of S and CSS; a and S respectively indicates standard deviation and derivative. FIG. 11A to FIG. 11B reports the recovered overall spectrum of the illumination employed for Antera's albedo measurement. Note that the various peaks correspond to the various types of narrow band LEDs on the device, and the intensity of the recovered peaks might be affected by the different orientations of the LEDs.

Supplementary Material

S1. Details of the Spectral Skin BSSRDF Model

Various terms, parameters and coefficients involved in the spectral skin BSSRDF model of [JSB*10] employed in this work are tabulated along with their descriptions in Table 1. The BSSRDF employs a multipole model for scattering in the thin epidermis, and a dipole model for scattering in the thicker dermis. To model subsurface scattering using the multipole and dipole formulations for epidermis and dermis layers, we need to first compute their absorption and scattering coefficients.

The wavelength $\lambda$ dependent spectral absorption coefficient for the epidermal layer is given as:

$$\sigma_a^{epi} = C_m[\beta_m \sigma_a^{em}(\lambda) + (1-\beta_m)\sigma_a^{pm}(\lambda)] + C_{he}[\gamma \sigma_a^{oxy}(\lambda) + (1-\gamma)\sigma_a^{deoxy}(\lambda)] + (1-C_m-C_{he})\sigma_a^{base}, \quad (S1)$$

where, the absorption coefficients for eumelanin and pheomelanin (two types of melanin in skin) is computed as:

$$\sigma_a^{em}(\lambda) = 6.6 \times 10^{10} \times \lambda^{-3.33} \text{ mm}^{-1}, \quad (S2)$$

$$\sigma_a^{pm}(\lambda) = 2.9 \times 10^{14} \times \lambda^{-4.75} \text{ mm}^{-1}, \text{ and} \quad (S3)$$

the baseline absorption coefficient $\sigma^{base}$ for the cellular matrix is defined as:

$$\sigma_a^{base}(\lambda) = 0.0244 + 8.53 e^{-(\lambda-154)/66.2} \text{ mm}^{-1}, \quad (S4)$$

Note that X in above equations is defined in nanometers. The absorption coefficients $\sigma_a^{oxy}$ and $\sigma_a^{deoxy}$ for the oxygenated and deoxygenated hemoglobin are borrowed from measurements provided in medical literature [DJ06].

Similar to epidermis, the absorption coefficient for the dermal layer is defined as:

$$\sigma_a^{derm}(\lambda) = C_h(\gamma \sigma_a^{oxy}(\lambda) + (1-\gamma)\sigma_a^{deoxy}(\lambda)) + (1-C_h) \sigma_a^{base}(\lambda). \quad (S5)$$

Next, the reduced scattering coefficient for the dermis is computed as:

$$\sigma'_s{}^{derm}(\lambda) = 7.37 \lambda^{-0.22} + 1.1 \times 10^{11} \times \lambda^{-4}, \text{ and} \quad (S6)$$

the reduced scattering coefficient for the epidermis is given by:

$$\sigma'_s{}^{derm}(\lambda) = 14.74 \lambda^{-0.22} + 2.2 \times 10^{11} \times \lambda^{-4}. \quad (S7)$$

Using $\sigma_a$ and $\sigma_s'$ as absorption and reduced scattering coefficients for the dipole formulation for dermis, its reflectance profile can be computed as explained by Donner and Jensen [DJ05].

Similarly, they also explain how transmittance and reflectance profiles for the epidermis can be computed using its absorption and reduced scattering coefficients with a multipole model. These individual profiles are then convolved to compute the net reflectance profile which is then subject to surface integration to compute diffuse albedo observed due to subsurface scattering in skin. We refer the reader to Donner&Jensen [DJ06] for further details.

Figures 20A, 20B, 20C:
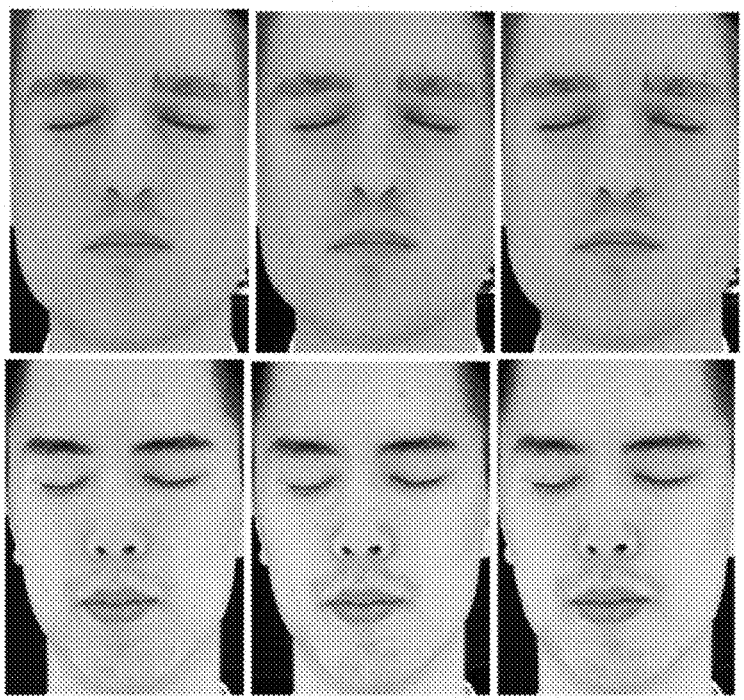
FIG. 20A to FIG. 20C: Comparison of facial photographs under uniform broad-band (W57 cool white LED) illumination (FIG. 20B) to reconstructions using the reduced 2D spectral model of Jimenez et al. [JSB*10] (FIG. 20A), and using the complete 4D model (FIG. 20C).
Figures 21A, 21B, 21C, 21D:
FIG. 21A to FIG. 21H: Estimated spectral parameters for a face of a Caucasian male subject, and comparison of photographs with reconstructions under different types of broadband illumination. Measurement using W 57 cool white LED for broadband illumination.
Figures 21E, 21F, 21G, 21H:
Figures 26A, 26B, 26C, 26D:
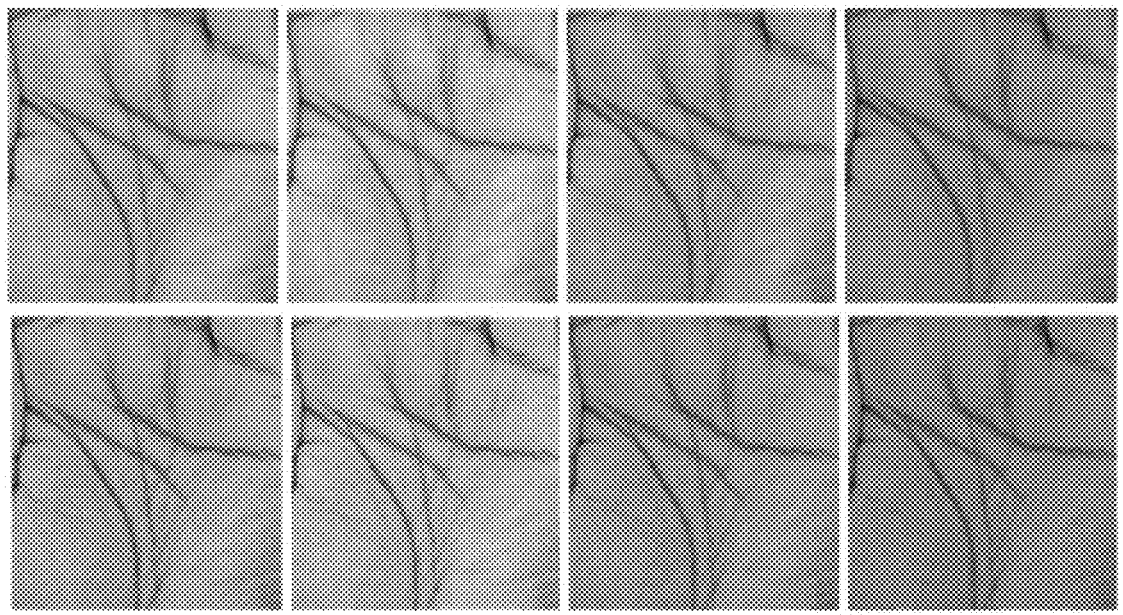
FIG. 26A to FIG. 26D: Photographs (top-row) vs reconstructions (bottom-row) of the palm under uniform illumination with four different spectra. The reconstructions use the estimated parameters in FIG. 6 (bottom-row).
Figures 27A, 27B, 27C, 27D:
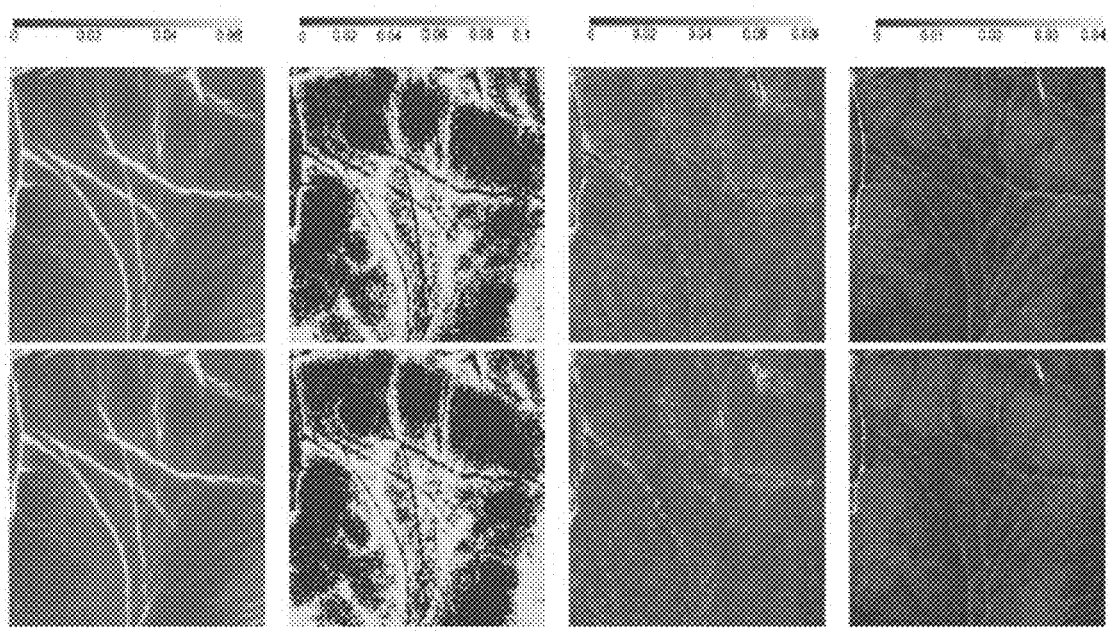
FIG. 27A to FIG. 27D: Comparison of estimated spectral parameters for the palm. Top-row: Using broad band W57+ narrow band blue LED illumination. Bottom-row: Joint-estimation using D65' broadband+narrow band blue LED illumination.

FIG. 20A to FIG. 20C shows comparisons of facial photographs under uniform broadband illumination, and their reconstruction using the reduced 2D spectral model employed by Jimenez et al. [JSB*10] with only two free parameters ($C_m$ and $C_h$) (FIG. 20A), and reconstruction using the complete 4D model with two additional free parameter ($\beta_m$, and $C_{he}$) (FIG. 20C). As can be seen, the 4D model allows a closer match to the spatially varying appearance of skin in the photographs.

S2. Measurements with LED Sphere

FIG. 22 and FIG. 23A to FIG. 23F show the spectra of illuminants, and the acquired photographs respectively, employed to estimate spectral parameters of a subject acquired using W57 cool white LED as the broadband in conjunction with narrow-band blue LED illumination. As can be seen, the process is very similar to the employment of D65 metamer for the broadband measurement and the estimated parameters are of sufficiently high quality to reconstruct skin appearance under different illumination spectra (see FIG. 21A to FIG. 21H).

Given the 6 types of LEDs in our LED sphere, we prefer to create an ideal broadband illumination by computing a weighted combination of all 6 LEDs to create a D65 metamer spectra (D65) which we employ for our broadband measurements. We notice a higher contrast in skin color, particularly coloration due to skin pigmentation and redness, under the D65 metamer illumination compared to any of the individual white LEDs including W57. This is consistent with our observation that D65 spectrum (blue dominant) balances the somewhat skewed red-dominant reflectance spectrum of human skin (see FIG. 24A to FIG. 24C).

FIG. 25A to FIG. 25D shows comparisons of parameter maps for a palm of a hand of a darker skin subject obtained using a single measurement under W57 illumination (top-row), vs our proposed two complementary measurements (bottom-row). As can be seen, our proposed approach of two complementary spectral measurements enables higher quality parameter estimation with less noise and clearer spatial structure of chromophore concentrations. Even for a single observation under broadband illumination, we see an improvement in the quality of estimated parameters when employing the D65 metamer illumination for the broadband measurement (center-row). Photograph-reconstruction comparisons of the palm under various illumination spectra can be seen in FIG. 26A to FIG. 26D.

FIG. 27A to FIG. 27D shows the spectral parameter maps for the palm estimated using W57+blue illumination (top-row), and D65'+blue (bottom-row). While qualitatively very similar, the parameters in the bottom-row estimated using D65' for the broadband measurement exhibit slightly reduced noise and better generalize to novel spectral illumination conditions.

For baseline measurements in the LED sphere, we also did an analysis of which type of broadband illumination is most suitable for estimating the spectral parameters of skin. Across four different skin types ranging from Caucasian, Mediterranean, Asian, and South Asian, we consistently found the reconstruction accuracy of estimation using the cold spectrum broadband illumination (W57) to be higher for reconstructing the appearance of skin under both colder and warmer broadband spectrums. And we also found a clear ordering in decreasing order of accuracy for generalization to a different illumination spectrum from W57, followed by W40, and then W27. This is why we selected the W57 as the choice for the baseline measurement. Measurements under each of these broadband condition were most accurate for reproducing the appearance under their own spectral conditions, pointing to some overfitting to the measurement spectrum. This issue is mitigated to quite an extent when we employ the D65 metamer illumination for broadband measurements, improving the generalization to a different illumination spectrum.

S3. Measurements with Antera3D

FIG. 28A to FIG. 28C presents a few additional examples of skin patches that we measured using the Antera device. This includes a forehead patch of a Caucasian subject (top-row), and the back of the hand (center row), and the palm (bottom row) for a subject with darker (South Asian) skin type. For all of these cases, initial mapping of the Antera parameters to the reduced 2D model shows noticeable differences in the reconstructed albedo (center-left column). However, we can see very good agreement between the reconstruction and the photograph using our procedure for adapting and augmenting Antera's parameter maps (center-right column), and even better matching to the photograph using a full 4D search over the parameter space driven by just the albedo map (right column), with softer reconstruction of the albedo similar to the photograph (which has baked-in subsurface scattering). The reconstruction errors (DeltaE94 metric in CIELAB) for various skin patches are reported in Table 2. Thus, either approaches could be used for rendering purposes in many cases with the caveat that our proposed approach for adapting and augmenting Antera's measurements may be more suitable for physiologically motivated simulations than the full 4D search method which tends to better explain the input data, but at the cost of reduced physiological correlation. This can be seen in the back of the hand example in FIG. 28A to FIG. 28C, where adapting Antera's maps is unable to model the veins on the hand very well (middle column) as veins are not physiologically explained by melanin and hemoglobin concentration. On the other hand, the full 4D search has enough degrees of freedom to explain the data and better reproduce the appearance of veins in this case but with reduced physiological interpretation of the parameter values.

S4. Additional Results and Rendering

FIG. 29A to FIG. 29C presents an example of a female subject where she was acquired twice (under W57 illumination), once under normal skin condition (FIG. 29A) and again when her cheeks were rather flushed (FIG. 29B). Given the estimated parameters for her skin from the first acquisition (shown in FIG. 8A to FIG. 8H in the main paper), we scale the corresponding $C_h$ and $C_{he}$ maps to simulate flushing in the cheek area shown in the reconstruction in (FIG. 29C). Here, we employed a manually created mask with edge softening to limit the scaling of the hemoglobin to areas around the cheek. As can be seen, the flushed simulation in (FIG. 29C) produces a reconstruction that is qualitatively quite similar to the photograph of actual flushed skin (FIG. 29B).

S4.1. Rendering Subsurface Scattering

In order to render heterogeneous subsurface scattering, we modified the provided subsurface scattering implementation in PBRT from the default dipole diffusion kernel to our specified spatially varying profiles implementing two-layered diffusion. We precompute and store the overall radial reflectance profile due to two-layered diffusion per surface point in linear RGB color space. PBRT framework identifies chromophore parameters mapped to that location and extracts the corresponding precomputed reflectance profile from the tabulated set of all sampled profiles generated with the coloration model for the illumination spectrum. Thereafter, PBRT integrates the selected reflectance profile over radial distances and performs the same operation for all other sampled points on the geometry to add contribution from different spectral profiles, thereby rendering heterogeneous subsurface scattering. The pipeline was implemented by modifying Diffusion-Reflectance structure from the dipole subsurface integrator, which reads in chromophore fractions and finds the index of spectral reflectance profile within the precomputed tabulated set. Then at run-time, for each generated radial distance from the current point on the surface the distance function will extract the radial profile for the closest sampled point and add it to the overall color contribution, thus integrating the spectral reflectance profile according to geometry and spatial variation in chromophores.

FIG. 30A to FIG. 30F presents corresponding diffuse-only renderings of subjects shown in FIG. 1A to FIG. 1C of the paper, rendered with a point light source with individual spectras of the six types of LEDs on the LED sphere (W57, W40, W27, Red, Green and Blue). Skin appearance change under the various LED spectrums, particularly the softening and reduction of skin texture under the warm white and red illumination respectively, is correctly predicted with our implementation of spatially varying subsurface scattering driven by estimated chromophore maps.

FIG. 31A to FIG. 31C presents a qualitative comparison of our proposed rendering with subsurface scattering (FIG. 31A) against photographs (FIG. 31B) of two male subjects with different skin types (Mediterranean and Asian skin-type respectively) lit with a single point light source (W40 neutral white LED not employed for parameter estimation). Here, the light source in the photographs was cross-polarized with respect to the camera, hence eliminating any specular reflection. We also present a rendering where the spectral parameters have been estimated under a single D65' broadband measurement (FIG. 31C). As can be seen, the renderings have a lot of qualitative similarity with the photographs and well approximate the appearance under a warmer broadband illumination condition. However, the renderings in (FIG. 31A) with joint-estimation under two complementary measurements better preserve skin texture details compared to the renderings in (FIG. 31C) with parameters estimated under a single broadband measurement which encodes a slight blur due to baked-in subsurface scattering.

S5. Limitation

The employed 4D skin BSSRDF model is well suited to reconstruct the appearance of skin and facial hair but has limitations and cannot well reconstruct the appearance of dominant veins or tattoos in skin. An example of this can be seen in FIG. 32A to FIG. 32B, where skin patches containing veins and a tattoo measured with the Antera device are not well reconstructed even with the full 4D search, and rather poorly reconstructed when using the adapted Antera maps for the reconstruction. This is because veins and tattoos cannot be modeled with melanin and hemoglobin concentrations, which is why Donner et al. [DWd*08] introduced an inter-layer absorption in their model to account for these.

Modifications

It will be appreciated that various modifications may be made to the embodiments hereinbefore described. Such modifications may involve equivalent and other features which are already known in the processing of images and/or in the design, manufacture and use of image illuminating and/or capturing apparatuses and component parts thereof and which may be used instead of, or in addition to, features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of image processing, comprising:
receiving a first image of human skin, the first image corresponding to a first, uniform broadband illumination condition;
receiving a second image which has the same field of view and contents as the first image, the second image corresponding to a second illumination condition which comprises a uniform narrowband illumination condition;
receiving or determining first spectral data corresponding to the uniform broadband illumination condition and second spectral data corresponding to the second illumination condition;
processing the first and second images to fit parameter maps for a spectral bidirectional scattering surface reflectance distribution function skin model, the parameter maps comprising a modelled melanin concentration, a modelled haemoglobin concentration, a modelled melanin blend-type fraction and a modelled epidermal haemoglobin fraction;
wherein at least three of the parameter maps are independent;
wherein processing the first and second images to fit parameter maps comprises applying a neural network model to inputs comprising:
spectral information comprising the first and second spectral data;
the first image; and
the second image;
wherein a final stage of the neural network outputs an output RGB albedo image, and wherein the neural network is configured to determine the parameter maps which minimise differences between the output RGB albedo image and the first image.

2. A method according to claim 1, wherein the uniform narrowband illumination condition corresponds to a blue narrowband illumination condition.

3. A method according to claim 1, wherein:
the second illumination condition consists of the uniform narrowband illumination condition; or
the second illumination condition comprises the uniform narrowband illumination condition superposed with the uniform broadband illumination condition.

4. A method according to claim 1, wherein the second illumination condition comprises the uniform narrowband illumination condition superposed with the uniform broadband illumination condition, and wherein applying a neural network model to inputs comprising the spectral information, the first image and the second image comprises:
generating a narrowband illumination image based on the first and second images; and
passing the first image, the narrowband illumination image and the spectral information as inputs to the neural network model.

5. A method according to claim 1, wherein determining first spectral data and second spectral data comprises:
receiving a third image of a colour test card, the third image corresponding to the uniform broadband illumination condition;
determining first spectral data corresponding to the broadband illumination condition based on the third image;
receiving a fourth image of the colour test card, the fourth image corresponding to the second illumination condition;
determining second spectral data corresponding to the second illumination condition based on the fourth image.

6. A method comprising:
receiving an albedo image showing human skin;
receiving or determining spectral data corresponding to an illumination condition used to obtain the albedo image;
processing the albedo image to fit parameter maps for a spectral bidirectional scattering surface reflectance distribution function skin model, the parameter maps comprising a modelled melanin concentration, a modelled haemoglobin concentration, a modelled melanin blend-type fraction and a modelled epidermal haemoglobin fraction;

wherein at least three of the parameter maps are independent;

wherein processing the albedo image to fit parameter maps comprises applying a neural network model to inputs comprising:
the albedo image; and
the spectral data;
wherein a final stage of the neural network outputs an output RGB albedo image, and wherein the neural network is configured to determine the parameter maps which minimise differences between the output RGB albedo image and the albedo image.

7. A method according to claim 6, wherein determining spectral data comprises:
receiving a calibration image of a colour test card, the calibration image corresponding to the illumination condition;
determining spectral data corresponding to the illumination condition based on the calibration image.

8. A method according to claim 6, further comprising:
receiving a first input parameter map related to melanin concentration and corresponding to the albedo image;
receiving a second input parameter map related to haemoglobin concentration and corresponding to the albedo image;
wherein inputs to the neural network model further comprise:
the first input parameter map; and
the second input parameter map.

9. A method of image processing, comprising:
receiving a first image of human skin, the first image corresponding to a first, uniform broadband illumination condition;
receiving a second image which has the same field of view and contents as the first image, the second image corresponding to a second illumination condition which comprises a uniform narrowband illumination condition;
receiving or determining first spectral data corresponding to the uniform broadband illumination condition and second spectral data corresponding to the second illumination condition;
processing the first and second images to fit parameter maps for a spectral bidirectional scattering surface reflectance distribution function skin model, the parameter maps comprising a modelled melanin concentration, a modelled haemoglobin concentration, a modelled melanin blend-type fraction and a modelled epidermal haemoglobin fraction;
wherein at least three of the parameter maps are independent;
wherein processing first and second images to fit parameter maps comprises using a three-dimensional spectral look-up table or using a four-dimensional spectral look-up table;
wherein the spectral look-up table is constructed based on spectral information comprising the first spectral data and the second spectral data, and further based on the spectral skin reflectance model.

10. A method according to claim 9, wherein the uniform narrowband illumination condition corresponds to a blue narrowband illumination condition.

11. A method according to claim 9, wherein:
the second illumination condition consists of the uniform narrowband illumination condition; or
the second illumination condition comprises the uniform narrowband illumination condition superposed with the uniform broadband illumination condition.

12. A method according to claim 9, wherein determining first spectral data and second spectral data comprises:
receiving a third image of a colour test card, the third image corresponding to the uniform broadband illumination condition;
determining first spectral data corresponding to the broadband illumination condition based on the third image;
receiving a fourth image of the colour test card, the fourth image corresponding to the second illumination condition;
determining second spectral data corresponding to the second illumination condition based on the fourth image.

13. A method comprising:
receiving an albedo image showing human skin;
receiving or determining spectral data corresponding to an illumination condition used to obtain the albedo image;
processing the albedo image to fit parameter maps for a spectral bidirectional scattering surface reflectance distribution function skin model, the parameter maps comprising a modelled melanin concentration, a modelled haemoglobin concentration, a modelled melanin blend-type fraction and a modelled epidermal haemoglobin fraction;
wherein at least three of the parameter maps are independent;
wherein processing the albedo image to fit parameter maps comprises using a three-dimensional spectral look-up table or using a four-dimensional spectral look-up table;
wherein the spectral look-up table is constructed based on the spectral data, and further based on the spectral skin reflectance model.

14. A method according to claim 13, wherein determining spectral data comprises:
receiving a calibration image of a colour test card, the calibration image corresponding to the illumination condition;
determining spectral data corresponding to the illumination condition based on the calibration image.

15. A method comprising:
receiving an albedo image showing human skin;
receiving or determining spectral data corresponding to an illumination condition used to obtain the albedo image;
receiving a first input parameter map related to melanin concentration and corresponding to the albedo image;
receiving a second input parameter map related to haemoglobin concentration and corresponding to the albedo image;
processing the albedo image to fit parameter maps for a spectral bidirectional scattering surface reflectance distribution function skin model, the parameter maps comprising a modelled melanin concentration, a modelled haemoglobin concentration, a modelled melanin blend-type fraction and a modelled epidermal haemoglobin fraction;
wherein at least three of the parameter maps are independent;
wherein processing the albedo image to fit parameter maps comprises:
processing the albedo image to fit first and second intermediate parameter maps for a two parameter spectral bidirectional scattering surface reflectance distribution function skin model, wherein the first intermediate parameter map comprises an intermediate melanin concentration and the second intermediate parameter map comprises an intermediate haemoglobin concentration, wherein the intermediate parameter maps are determined using a first two-dimensional spectral look up table constructed based on the spectral data;

re-scaling the first and second input parameter maps based on the intermediate parameter maps;

setting the parameter map corresponding to the modelled melanin concentration equal to the re-scaled first input parameter map;

setting the parameter map corresponding to the modelled haemoglobin concentration equal to the re-scaled second input parameter map;

processing the albedo image to fit the parameter maps corresponding to the modelled melanin blend-type fraction and the modelled epidermal haemoglobin fraction, wherein the parameter maps are determined using a second two-dimensional spectral look up table constructed based on the spectral data.

16. A method according to claim 15, wherein determining spectral data comprises:

receiving a calibration image of a colour test card, the calibration image corresponding to the illumination condition;

determining spectral data corresponding to the illumination condition based on the calibration image.

* * * * *